US006952693B2

(12) United States Patent
Wolff et al.

(10) Patent No.: US 6,952,693 B2
(45) Date of Patent: Oct. 4, 2005

(54) DISTRIBUTED MINING OF ASSOCIATION RULES

(76) Inventors: Ran Wolff, Geva-Carmel 80355 (IL); Assaf Schuster, 13 Lincoln Street, Haifa (IL)

( * ) Notice: Subject to any disclaimer, the term of this patent is extended or adjusted under 35 U.S.C. 154(b) by 706 days.

(21) Appl. No.: 10/080,968

(22) Filed: Feb. 22, 2002

(65) Prior Publication Data

US 2002/0198877 A1 Dec. 26, 2002

Related U.S. Application Data

(60) Provisional application No. 60/271,165, filed on Feb. 23, 2001.

(51) Int. Cl.[7] ............................................ G06F 17/30
(52) U.S. Cl. ............................ 707/6; 719/313; 707/10; 709/218
(58) Field of Search ..................... 707/1–10, 100–102, 707/103 R–103 Z, 104.1; 719/313–315; 709/200–203, 217–219; 705/10

(56) References Cited

U.S. PATENT DOCUMENTS

| 5,615,341 | A | * | 3/1997 | Agrawal et al. | ............... 705/10 |
| 5,724,573 | A | * | 3/1998 | Agrawal et al. | ............... 707/6 |
| 5,794,209 | A | * | 8/1998 | Agrawal et al. | ............... 705/10 |
| 5,813,003 | A | * | 9/1998 | Chen et al. | ............... 707/6 |
| 6,272,478 | B1 | * | 8/2001 | Obata et al. | ............... 706/12 |
| 6,278,998 | B1 | * | 8/2001 | Ozden et al. | ............... 707/6 |
| 6,415,287 | B1 | * | 7/2002 | Wang et al. | ............... 707/6 |
| 6,553,359 | B1 | * | 4/2003 | Schwenkreis | ............... 706/46 |
| 6,711,577 | B1 | * | 3/2004 | Wong et al. | ............... 707/101 |

| 2003/0009467 | A1 | * | 1/2003 | Perrizo | ............... 707/100 |

OTHER PUBLICATIONS

Agrawal and Srikant, "Fast Algorithms for Mining Association Rules", Proceedings of the 20th International Conference on Very Large Databases (VLDB94—Santiago, Chile, 1994), pp. 487–499.

Agrawal and Shafer, "Parallel Mining of Association Rules", IEEE Transactions on Knowledge and Data Engineering 8:6 (1996), pp. 962–969.

Cheung, et al., "A Fast Distributed Algorithm for Mining Association Rules", Proceedings of the 1996 International Conference on Parallel and Distributed Information Systems (Miami Beach, Florida, 1996), pp. 31–44.

Cheung and Xiao, "Effect of Data Skewness in Parallel Mining of Association Rules", Second Pacific–Asia Conference of Knowledge Discovery and Data Mining (1998), pp. 48–60.

* cited by examiner

*Primary Examiner*—St. John Courtenay, III
(74) *Attorney, Agent, or Firm*—Hoffman, Wasson & Gitler, P.C.

(57) ABSTRACT

A method for mining association rules in a database that is divided into multiple partitions associated with respective computing nodes. The method includes transmitting messages among the nodes with respect to local support of an itemset in the respective partitions of the database. Responsive to the messages transmitted by a subset of the nodes, the itemset is determined to be globally frequent in the database before the nodes outside the subset have transmitted the messages with respect to the local support of the itemset in their respective partitions. An association rule is computed with respect to the itemset, responsive to having determined the itemset to be globally frequent.

32 Claims, 8 Drawing Sheets

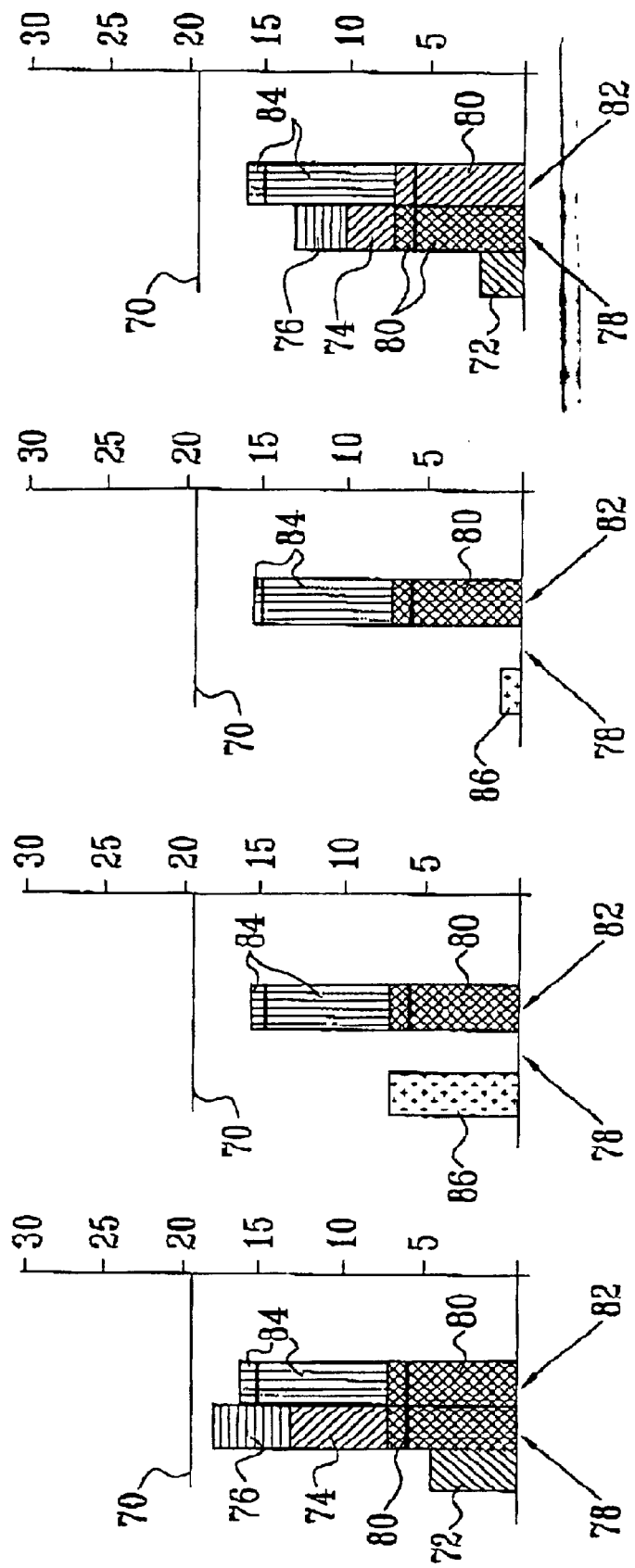

DISTRIBUTED MINING OF ASSOCIATION RULES

CROSS-REFERENCE TO RELATED APPLICATION

This application claims the benefit of U.S. Provisional Patent Application 60/271,165, filed Feb. 23, 2001, which is incorporated herein by reference.

FIELD OF THE INVENTION

The present invention relates generally to database mining, and specifically to discovery of association rules in large transactional databases.

BACKGROUND OF THE INVENTION

Association Rule Mining (ARM) in large transactional databases is a central problem in the field of knowledge discovery. The input to the ARM is a database in which objects are grouped by context. An example of such a grouping would be a list of items grouped by the customer who bought them. A then finds sets of objects which tend to associate with one another. Given two distinct sets of objects, X and Y, we say Y is associated with X if the appearance of X in a certain context usually implies that Y will appear in that context as well. If X usually implies Y, we then say that the rule $x \Rightarrow Y$ is confident in the database.

Typically, an association rule is of practical interest only if it appears in more than a certain number of contexts. If it does, we say that the rule is frequent, i.e., that it has a large support. The thresholds of support (MinSup) and confidence (MinConf) are parameters that are used to define which association rules are of interest. These parameters are usually supplied by the user according to his needs and resources. The solution to the ARM problem is a list of all association rules that are both frequent and confident in that database. Such lists of rules have many applications in the context of understanding, describing and acting upon the database.

A variety of algorithms have been developed for ARM, such algorithms are described, for example, by Agrawal and Srikant in "Fast Algorithms for Mining Association Rules," *Proceedings of the 20th International Conference on Very Large Databases* (*VLDB94*—Santiago, Chile, 194), pages 487–499, which is incorporated herein by reference. It has been shown that the major computational task in ARM is the identification of all the frequent itemsets, i.e., those sets of items which appear in a fraction greater than MinSup of the transactions. Association rules can then be produced from these frequent itemsets in a straightforward manner. For example, once it is known that both {Pasta Sauce} and {Pasta Sauce, Parmesan} are frequent itemsets, the association rule {Pasta Sauce}$\Rightarrow${Parmesan} is obviously frequent, and all that remains is to check whether the association is confident. Because databases are often very large and are typically stored in secondary memory (disk), ARM algorithms known in the art are mainly concerned with reducing the number of database scans required to arrive at the desired collection of frequent itemsets, and hence to determine the confident association rules.

In the above-mentioned paper, Agrawal and Srikant describe an ARM algorithm that they call "Apriori." The algorithm begins by assuming that any item in a candidate to be a frequent itemset of size k=1. Apriori then performs several rounds of a two-phased computation. In the first phase of the kth round, the database is scanned, and support counts are calculated for all k-size candidate itemsets. Those candidate itemsets that have support above the user-supplied MinSup threshold are considered frequent itemsets. In the second phase, candidate k+1-size itemsets are generated from the set of frequent k-size itemsets if and only if all their k-size subsets are frequent. The rounds terminate when the set of frequent k-size itemsets is empty.

In Distributed Association Rule Mining (D-ARM), the ARM problem is restated in the context of distributed computing. In D-ARM, the database is partitioned among several nodes that can perform independent parallel computations, as well as communicate with one another. A number of algorithms have been proposed to solve the D-ARM problem, particularly for share-nothing machines (i.e., distributed computing systems in which each node uses its own separate memory). An exemplary D-ARM algorithm is described by Agrawal and Shafer in "Parallel Mining of Association Rules," *IEEE Transactions on Knowledge and Data Engineering* 8:6 (1996), pages 962–969, which is incorporated herein by reference. D-ARM has a major advantage over conventional ARM, in that it parallelizes disk I/O operations. The main difficulty for D-ARM algorithms is communication complexity among the nodes. The most important factors in the communication complexity of D-ARM algorithms are the number of partitions (or computing nodes), n, and the number of itemsets, |C|, considered by the algorithm.

Agrawal and Shafer present two major approaches to D-ARM: data distribution (DD) and count distribution (CD). DD focuses on the optimal partitioning of the database in order to maximize parallelism. CD, on the other hand, considers a setting in which the data are arbitrarily partitioned horizontally among the parties to begin with, and focuses on parallelizing the computation. (Horizontal partitioned means that each partition includes whole transactions, in contrast with vertical partitioning, in which the same transaction is split among several parties.) The DD approach is not always applicable, since at the time the data are generated, they are often already partitioned. In many cases, the data cannot be gathered and repartitioned for reasons of security and secrecy, cost of transmission, or just efficiency. DD is thus more applicable to systems that are dedicated to performing D-ARM. CD, on the other hand, is typically a more appealing solution for systems that are naturally distributed over large expanses, such as stock exchange and credit card systems.

The CD algorithm presented by Agrawal and Shafer is a parallelization of the Apriori algorithm described above. In the first phase of CD, each of the nodes performs a database scan independently on its own partition. Then the nodes exchange their scan results, and a global sum reduction is performed on the support counts of each candidate itemset. Those itemsets whose global support is larger than MinSup are considered frequent. The second phase, calculating the candidate k+1-size itemsets, can be carried out without any communication, because the calculation depends only on the identity of the frequent k-size itemsets, which is known to all parties by this time. Thus, CD fully parallelizes the disk I/O complexity of Apriori and performs roughly the same computations. CD also requires one synchronization point on each round and carries an $O(|C| \cdot n)$ communication complexity penalty. Since typical values for |C| are tens or hundreds of thousands, CD is not scalable to large numbers of partitions.

In order to reduce this communication load, Cheung et al. introduced the FDM algorithm, in "A Fast Distributed Algorithm for Mining Association Rules," *Proceeding of the*

1996 *International Conference on Parallel and Distributed Information Systems* (Miami Beach, Fla., 1996), pages 31–44, which is incorporated herein by reference. FDM takes advantage of the fact that ARM algorithms look only for rules that are globally frequent. FDM is based on the inference that in order for an itemset to appear among all the transactions in the database with a given frequency, there must be at least one partition of the database in which the itemset appears at the given frequency or greater. Therefore, in FDM, the first stage of CD is divided into two rounds of communication: In the first round, every party names those candidate itemsets that are locally frequent in its partition (because they appear in the partition with a frequency greater than or equal to MinSup/|database|). In the second round, counts are globally summed only for those candidate itemsets that were named by at least one party. If the probability that an itemset will have the potential of being frequent is $Pr_{potential}$, then FDM only communicates $Pr_{potential} \cdot |C|$ of the itemsets. It thus improves the communication complexity to $O(Pr_{potential} \cdot |C| \cdot n)$.

FDM is problematic when large numbers of nodes are involved in the computation, because $Pr_{potential}$ is not scalable in n, and quickly increases to 1 as n increases, particularly in inhomogeneous databases. This problem was pointed out by Cheung and Xiao in "Effect of Data Skewness in Parallel Mining of Association Rules," *Second Pacific-Asia Conference of Knowledge Discovery and Data Mining* (1998), pages 48–60, which is incorporated herein by reference. The authors show that as the inhomogeneity of the database increases, FDM pruning techniques become ineffective.

Over the past few years, distributed information systems have become a mainstream computing paradigm, and the wealth of information available in these systems is constantly expanding. Examples of distributed information resources of this sort include a company's Virtual Private Network, a multi-server billing center, a network of independent stockbrokers, and a peer-to-peer MP3 library, such as Napster™. There is a growing need for tools that can assist in understanding and describing such information. These new databases differ from distributed databases of the past, in that the partitioning of the data is usually skewed, the connections between partitions are sparse and often unreliable, and variable throughputs and latencies may apply to different nodes. These characteristics accentuate the inadequacies of D-ARM methods known in the art.

SUMMARY OF THE INVENTION

It is an object of the present invention to provide improved methods for Distributed Association Rules Mining (D-ARM).

It is a further object of some aspects of the present invention to provide D-ARM methods with reduced communication complexity.

It is yet a further object of some aspects of the present invention to provide D-ARM methods that are robust in the face of database skew and inhomogeneity.

In preferred embodiments of the present invention, a data mining system comprises a plurality of computing nodes, each node having a local memory that contains a respective partition of a distributed database. The nodes are mutually connected by a network, which enables all the nodes to transmit and receive messages one to another, preferably broadcast messages. The nodes cooperatively calculate the set of candidate itemsets whose support exceeds a predetermined minimum, preferably using an Apriori-type iterative algorithm, as described above, wherein after all the k-size itemsets have been determined, they are used to find the k+1-size itemsets.

At each stage in the calculation (i.e., for each value of k), each node broadcasts support counts of itemsets that it believes to be frequent over the entire database. Unlike algorithms known in the art, such as FDM, however, in preferred embodiments of the present invention, the fact that an itemset is locally frequent in one partition is not considered sufficient evidence to trigger collection of all the support counts of the itemset from all the nodes. Rather, the choice of which itemset to broadcast is based on dynamic candidacy criteria, indicating which itemsets are likely to be globally frequent. The global support counts and criteria of the itemsets are recalculated asynchronously by each of the nodes, based on the messages it has received from the other nodes. The nodes continue to broadcast the support counts of possible candidate itemsets and to update the candidacy criteria accordingly, until all the nodes have agreed on the same set of globally-frequent candidates. Only after this point do all nodes broadcast their support counts for the agreed-upon candidates, if they have not yet done so.

Preferred embodiments of the present invention thus reduce the communication complexity of D-ARM algorithms, by avoiding wasted communications on itemsets that are locally frequent but globally infrequent. It can be shown that the methods of the present intention have a communication complexity that is linear in the number of partitions (or nodes) n and in the number of itemsets |C|, with a very stall database-dependent multiplicative factor, much smaller than the $Pr_{potential}$ multiplier of the FDM method. Even for moderate values of n, these methods require only a fraction of the communication bandwidth used by methods known in the art. Therefore, in bandwidth-limited systems, the methods of the present invention enable association rules to be mined with superior efficiency and speed.

There is therefore provided, in accordance with a preferred embodiment or the present invention, a method for mining association rules in a database that is divided into multiple partitions associated with respective computing nodes, the method including;

transmitting messages among the nodes with respect to local support of an itemset in the respective partitions of the database;

responsive to the messages transmitted by a subset of the nodes, determining the itemset to be globally frequent in the database before the nodes outside the subset have transmitted the messages with respect to the local support of the itemset in their respective partitions; and computing an association rule with respect to the itemset, responsive to having determined the itemset to be globally frequent.

Preferably, transmitting the messages includes conveying the messages over a communication network connecting the nodes one to another. Most preferably, conveying the messages includes broadcasting the messages. Additionally or alternatively, conveying the messages includes stacking a plurality of the messages together in a single data frame for transmission over the network.

Preferably, transmitting the messages includes computing a candidacy criterion at each of the nodes, for use in determining whether the itemset is globally frequent, and choosing the itemset with respect to which one of the messages is to be transmitted responsive to the candidacy criterion. Most preferably, computing the candidacy criterion includes receiving one of the messages sent by another one of the nodes, and recomputing the candidacy criterion responsive to the local support conveyed by the received message, wherein choosing the itemset includes deciding whether to transmit another one of the messages with respect to the itemset based on the recomputed criterion. Further preferably, deciding whether to transmit another one of the messages includes transmitting another one of the messages only until a conclusion is reached, responsive to the candidacy criterion, as to whether the itemset is globally frequent in the database. Additionally or alternatively, transmitting the messages includes terminating transmission of the messages when the candidacy criterion computed at every one of the nodes agrees as to whether the itemset is globally frequent.

Typically, the itemset is one of a plurality of itemset in the database, and computing the candidacy criterion includes computing respective candidacy criteria for the plurality of the itemsets, wherein choosing the itemsets includes ranking the itemsets responsive to the respective candidacy criteria for transmission of the messages with respect thereto. In a preferred embodiment, ranking the itemsets includes determining a respective ranking for each of the nodes, and transmitting the messages includes selecting one of the nodes that is to transmit the messages, responsive to the respective ranking. Preferably, determining the respective ranking includes updating the ranking as the messages are transmitted, and selecting the one of the nodes includes changing a selection of the one of the nodes that it to transmit the messages responsive to a change in the ranking.

Preferably, computing the association rule includes collecting the local support of the itemset from the nodes outside the subset, for use in computing the association rule applicable to the itemset, only after it is determined that the itemset is globally frequent. Typically, the itemset in one of a plurality of itemsets in the database, and collecting the local support includes collecting the local support of the itemsets that were determined to be globally frequent, while ignoring the local support of the itemsets that were not determined to be globally frequent.

In a preferred embodiment, computing the association rule includes assessing a confidence level of the rule responsive to the local support, and collecting the local support includes computing a confidence criterion at each of the nodes, for use in determining whether the confidence level is above a predetermined threshold, and choosing the itemset with respect to which the local support is to be collected responsive to the confidence criterion. Preferably, computing the confidence criterion includes receiving the local support sent by another one of the nodes, and recomputing the confidence criterion responsive to the received local support, wherein choosing the itemset includes continuing to collect the local support until it is determined that the confidence level is above the predetermined threshold, based on the recomputed criterion.

Typically, the itemset is one of a plurality of itemsets in the database, each of the itemsets having a size, and determining the itemset to be globally frequent includes finding the itemsets of size k that are globally frequent, and transmitting the messages includes transmitting the messages with respect to the local support of the itemsets of size k+1 all of whose subsets are itemsets of size k that were found to be globally frequent.

There is also provided, in accordance with a preferred embodiment of the present invention, a method for mining association rules in a database that is divided into multiple partitions associated with respective computing nodes, the partitions including at least first and second partitions respectively associated with at least first and second nodes among the computing nodes, the method including:

computing an initial candidacy criterion at each of the nodes, for use in determining whether an itemset is globally frequent in the database;

responsive to the candidacy criterion, transmitting a first message from the first node to the other nodes conveying a local support of the itemset in the first partition;

upon receiving the message, recomputing the candidacy criterion at the second node responsive to the local support conveyed by the message;

transmitting, responsive to the recomputed candidacy criterion, a second message from the second node to the other nodes, conveying the local support of the itemset in the second partition; and computing an association rule with respect to the itemset, responsive to the first and second messages.

Typically, the nodes further include a third node, and the method includes recomputing the candidacy criterion at the third node, responsive to the first and second messages, and determining at the third node that the itemset is globally frequent based on the recomputed criterion. Preferably, determining at the third node that the itemset is globally frequent includes making a conclusive determination that the itemset is globally frequent before all the nodes have transmitted messages conveying the local support of the itemset in the respective partitions of the database. Further preferably, computing the association rule includes computing the rule responsive to having determined that the itemset is globally frequent based on the recomputed criteria.

Preferably, computing the initial candidacy criteria includes computing at each of the first and second nodes a local hypothesis as to whether the itemset is globally frequent, based on the local support of the itemset in the first and second partitions, respectively, and recomputing the candidacy criterion includes recomputing the local hypothesis and computing a global hypothesis as to whether the itemset is globally frequent, based on the local support conveyed in the first message, and transmitting the second message includes deciding whether to transmit the second message responsive to the local and global hypotheses. Most preferably, deciding whether to transmit the second message includes deciding to transmit the second message only if the local and global hypotheses computed at the second node disagree as to whether the itemset is globally frequent.

Typically, the itemset is one of a plurality of itemsets in the database, and computing and recomputing the candidacy criterion include computing and recomputing respective local and global hypotheses for the plurality of the itemsets, and transmitting the first and second messages includes choosing the itemset with respect to which the messages are to be transmitted responsive to the respective hypotheses. In a preferred embodiment, choosing the itemset includes ranking the itemsets responsive to a measure of disagreement between the local and global hypotheses with respect to the itemsets. Preferably, deciding whether to transmit the second message includes, if none of the local and global hypotheses disagree, transmitting a pass message.

There is additionally provided, in accordance with a preferred embodiment of the present invention, apparatus for mining association rules, including:

a plurality of storage devices, adapted to hold respective partitions of a database; and a corresponding plurality of computing nodes, each node being associated with a respective one of the storage devices and coupled to communicate with the other nodes over a communication network, the nodes being adapted to transmit messages one to another with respect to local support of an itemset in the respective partitions of the database, and responsive to the messages transmitted by a subset of the nodes, to determine the itemset to be globally frequent in the database before the nodes outside the subset have transmitted the messages with respect to the local support of the itemset in their respective partitions, and to compete an association rule with respect to the itemset, responsive to having determined the itemset to be globally frequent.

There is further provided, in accordance with a preferred embodiment of the present invention, apparatus for mining association rules, including:

a plurality of storage devices, adapted to hold respective partitions of a database, including at least first and second storage devices: holding respective first and second partitions of the database; and a corresponding plurality of computing nodes, each node being associated with a respective one of the storage devices, including at least first and second nodes respectively associated with the first and second storage devices, the nodes being coupled to communicate with one another over a communication network, each of the nodes further being adapted to compute an initial candidacy criterion, for use in determining whether an itemset is globally frequent in the database, such that responsive the candidacy criterion, the first node transmits a first message to the other nodes conveying a local support of the itemset in the first partition, and such that upon receiving the message, the second node recomputes the candidacy criterion responsive to the local support conveyed by the message and transmits, responsive to the recomputed candidacy criterion, a second message from the second node to the other nodes, conveying the local support of the itemset in the second partition, so that the nodes compute an association rule with respect to the itemset responsive to the first and second messages.

There is moreover provided, in accordance with a preferred embodiment of the present invention, a computer software product, including a computer-readable medium in which program instructions are stored, which instructions, when read by computing nodes that are associated with respective storage devices holding respective partitions of a database and are coupled to communicate with one another over a communication network, cause the nodes to transmit messages one to another with respect to local support of an itemset in the respective partitions of the database, and responsive to the messages transmitted by a subset of the nodes, to determine the itemset to be globally frequent in the database before the nodes outside the subset have transmitted the messages with respect to the local support of the itemset in their respective partitions, and to compute an association rule with respect to the itemset, responsive to having determined the itemset to be globally frequent.

There is furthermore provided, in accordance with a preferred embodiment of the present invention, a computer software product, including a computer-readable medium in which program instructions are stored, which instructions, when read by computing nodes that are associated with respective partitions of a database, including at least first and second nodes respectively associated with first and second partitions of the database, and which are coupled to communicate with one another over a communication network, cause the nodes to compute an initial candidacy criterion, for use in determining whether an itemset is globally frequent in the database, and responsive the candidacy criterion, cause the first node to transmit a first message to the other nodes conveying a local support of the itemset in the first partition, and cause the second node, upon receiving the message, to recompute the candidacy criterion responsive to the local support conveyed by the message and to transmit, responsive to the recomputed candidacy criterion, a second message to the other nodes, conveying the local support of the itemset in the second partition, and cause the nodes to compute an association rule with respect to the itemset responsive to the first and second messages.

There is also provided, in accordance with a preferred embodiment of the present invention, a method for processing items in a database that is divided into multiple partitions associated with respective computing nodes, the method including:

transmitting messages among the nodes conveying local information regarding an itemset in the respective partitions of the database;

responsive to the messages transmitted by a subset or the nodes, determining the itemset to be globally significant with respect to a decision to be made in reference to the database before the nodes outside the subset have transmitted the messages with respect to the local information regarding the itemset in their respective partitions; and making the decision with respect to the itemset, responsive to having determined the itemset to be globally significant.

There is additionally provided, in accordance with a preferred embodiment of the present invention, a method for reaching a decision regarding items item in a database that is divided into multiple partitions associated with respective computing nodes, the partitions including at least first and second partitions respectively associated with at least first and second nodes among the computing nodes, the method including:

computing an initial candidacy criterion at each of the nodes, for use in selecting an itemset in the database of potential significance to the decision;

responsive to the candidacy criterion, transmitting a first message from the first node to the other nodes conveying local information regarding the itemset in the first partition;

upon receiving the message, recomputing the candidacy criterion at the second node responsive to the local information conveyed by the message;

transmitting, responsive to the recomputed candidacy criterion, a second message from the second node to the other nodes, conveying the local information regarding the itemset in the second partition; and making the decision with respect to the itemset, responsive to the first and second messages.

Preferably, computing the initial candidacy criterion includes determining the candidacy criterion based on a target function selected responsive to the decision that is to be made.

The present invention will be more fully understood from the following detailed description of the preferred embodiments thereof, taken together with the drawings in which:

BRIEF DESCRIPTION OF THE DRAWINGS

FIGS. 3A–D, 4A–D and 5A–D are bar charts, that schematically illustrate successive stages encountered in carrying out the method of FIGS. 2A and 2B on an exemplary database.

DETAILED DESCRIPTION OF PREFERRED EMBODIMENTS

Notation

Let $I=\{i_1, i_2, \ldots, i_m\}$ be the set of items in the database to be mined. A transaction t is a subset of I. Let DB be a list of D such transactions. Let $\overline{DB}=\{DB^1, DB^2, \ldots, DB^n\}$ be a partition of DB into n partitions with sizes $\overline{D}=\{D^1, D^2, \ldots, D^n\}$ respectively. An itemset is some $X \subseteq I$. Since identical itemset exist for all nodes participating in all the methods described herein, we will denote them as $X_1, X_2, \ldots, X_n$. For any $X_i$ and $db \subseteq DB$, let $Support(X_i, db)$ be the number of transactions in db that contain all the items of $X_i$. We call $x_i^j = Support(X_i, DB^j)$ the local support of $X_i$ in partition j, and $Support(X_i, DB)$ its global support.

For some user-defined support threshold $0 \leq MinSup \leq 1$, we say that $X_i$ is frequent iff $Support(X_i, DB) \geq MinSup \cdot D$ and infrequent iff $Support(X_i, DB) < MinSup \cdot D$. We say $X_i$ is locally frequent in the j partition iff $Support(X_i, DB^j) \leq MinSup \cdot D^j$. Let $X_a$, $X_p$ be two frequent itemsets such that $X_p \subset X_a$, and let $0 < MinConf \leq 1$ be some user-defined confidence threshold. We say the rule $r_{ap}: X_p \Rightarrow X_a \backslash X_p$ is confident iff $Support(X_a, DB) \leq MinConf \cdot Support(X_p, DB)$. The D-ARM problem addressed by preferred embodiments of the present invention is to distributively find all the rules of the form $X \Rightarrow Y$, while minimizing the amount of communications, as well as the number of times $Support(\cdot, DB^1)$ is evaluated.

The messages the nodes send to one another are pairs $(i, x_i^j)$, wherein i is an itemset (or rule) number, and $X_i^j = Support(X_i, DB^j)$. We will assume that j, the origin of the message, can be inferred from information contained in the message, such as a message header. For each node p and itemset $X_i$, let $G^p(X_i)$ be the group of all $x_i^j$ such that $(i, X_i^j)$ was received by p. We will assume $G^p(X_i)$ is equal for all p and refer to it as $G(X_i)$. $\overline{D}$ is either known to all nodes in advance or can be exchanged in the first n messages.

System and Methods

Figure 1:
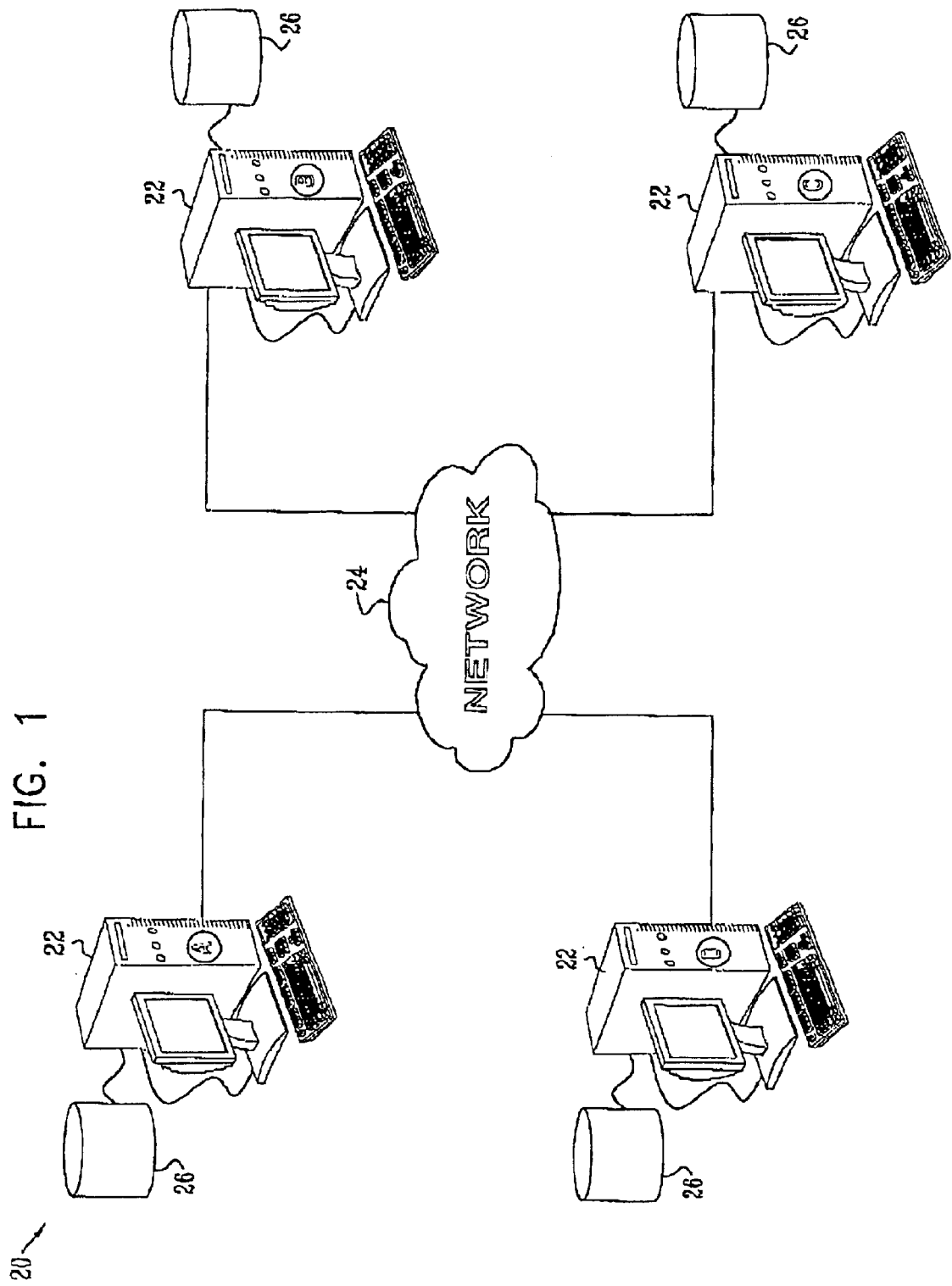
FIG. 1 is a schematic, pictorial illustration of a system for distributed association rule mining (D-ARM), in accordance with a preferred embodiment of the present invention.

FIG. 1 is a schematic, pictorial illustration of a system 20 for distributed association rule mining (D-ARM), in accordance with a preferred embodiment of the present invention. System 20 comprises a plurality of computing nodes 22, connected by a communication network 24, typically a local area network (LAN) or system area network (SAN), as are known in the art. For simplicity of illustration, four nodes are shown, labeled A, B, C and D, although typically, a much larger number of nodes may be involved in D-ARM operations. Each node typically comprises a central processing unit (CPU), programmed in software to carry out the functions described hereinbelow. This software may be downloaded to nodes 22 in electronic form, over network 24, for example, or it may alternatively be supplied to the nodes on tangible media, such as CD-ROM. Each of the nodes has a local storage memory 26, such as a disk, which contains a asynchronously, at each of nodes 22 that is participating in mining the database. As described below, the data contained in the messages, received in the process of FIG. 2B, serves as input to the computations performed in the process of FIG. 2A. At the same time, the state of the process of FIG. 2A determines how the incoming messages are treated in the process of FIG. 2B.

The basic idea behind the DDM method is to verify that an itemset is globally frequent before collecting its support counts from all nodes. This approach differs from FDM in that in DDM, the fact that an itemset is locally frequent in one partition is not considered sufficient evidence to trigger the collection of all the support counts of the itemset from all the nodes. Instead, the nodes perform a sort of negotiation, at the end of which they have decided which candidate itemsets are globally frequent and which are not. The support counts of the frequent itemsets are then collected optimally, with no communication wasted on locally-frequent itemsets that are, nonetheless, globally infrequent.

Nodes 22 negotiate by exchanging messages containing local support counts for various itemsets. At any given point in the process of FIG. 2A, a common hypothesis H is shared by all nodes concerning the global support of each candidate itemset. As the nodes receive local support counts for an itemset, they adjust this hypothesis until it correctly predicts whether the itemset is frequent or infrequent. In addition, every node computes another private hypothesis P, based on the support counts already expressed by other nodes and the node's own local support count for each candidate itemset. For at least one node partition of a database that is to be mined for association rules.

In order to carry out D-ARM operations, nodes 22 transmit and receive broadcast messages over network 24. Any suitable communication protocol may be used for this purpose, for example, an Ethernet (IEEE 802.3) or Fast Ethernet protocol, as are known in the art. Generally, these protocols generate frames of fixed size, typically 96 bytes for Fast Ethernet, or 1500 bytes for Ethernet, and any messages of greater length are broken up into multiple frames. As the number of nodes 22 in system 20, the communication burden of D-ARM grows at least linearly, and the communication bandwidth typically becomes the chief bottleneck. In order to make the most efficient possible use of the available communication resources, nodes 22 preferably stack short broadcast messages together to fill up a frame. Such stacking is not essential to the operation of the present invention, however.

Figure 2A:
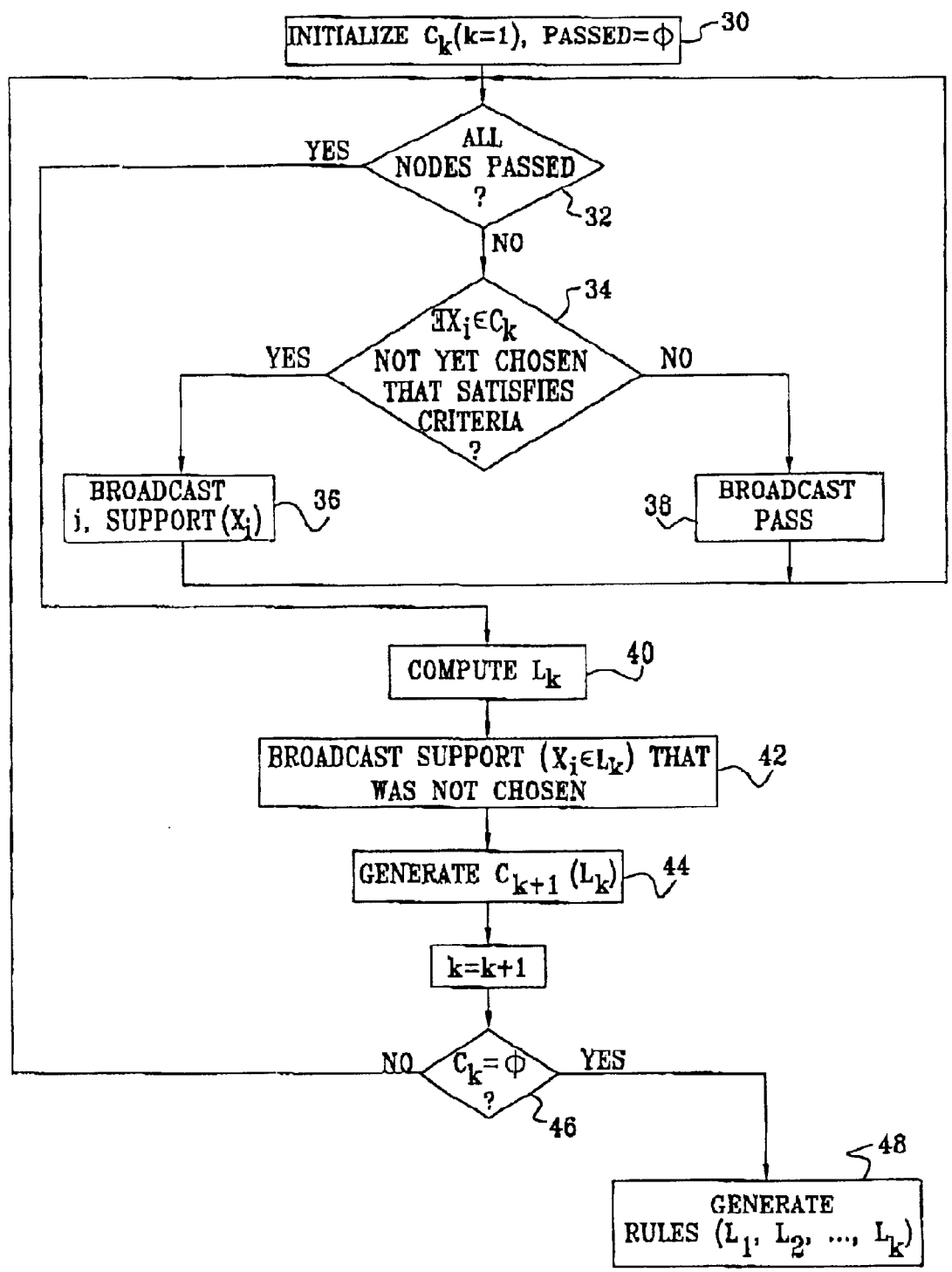
FIGS. 2A and 2B are flow charts that schematically illustrate a method for D-ARM, in accordance with a preferred embodiment of the present invention.
Figure 2B:
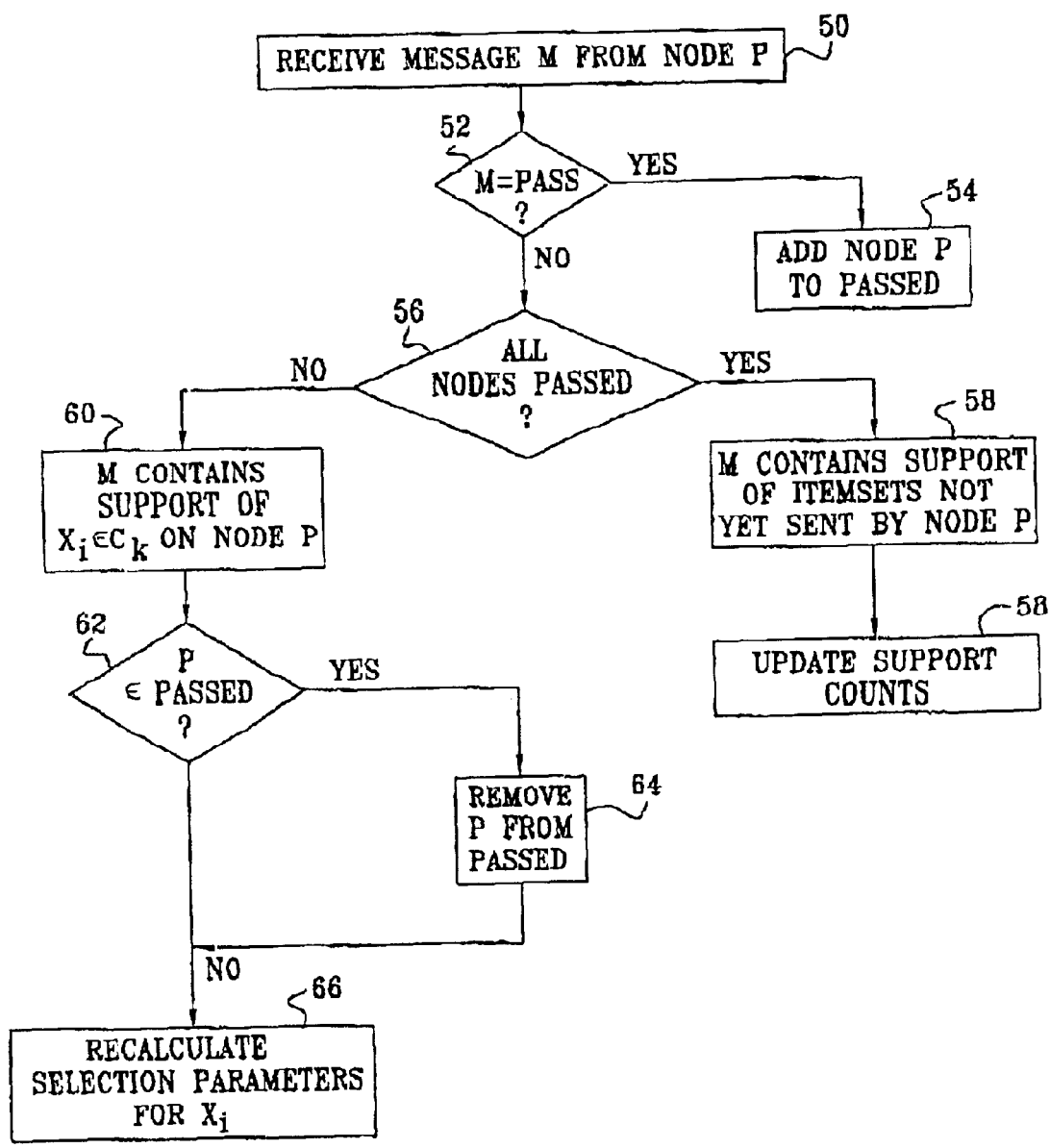
Figure 3A:
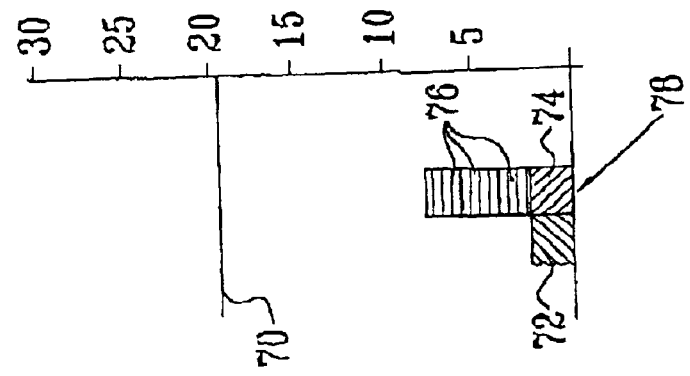
Figure 3B:
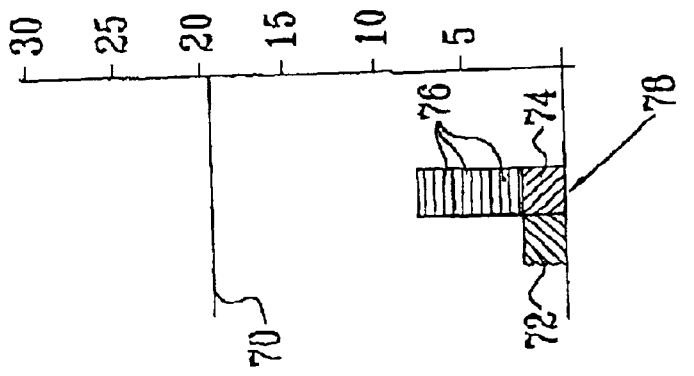
Figure 3C:
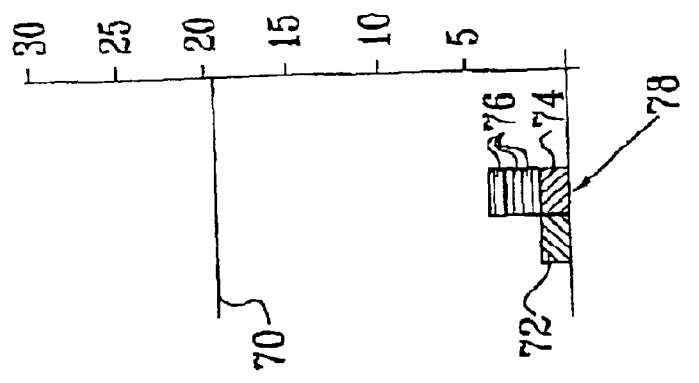
Figure 3D:
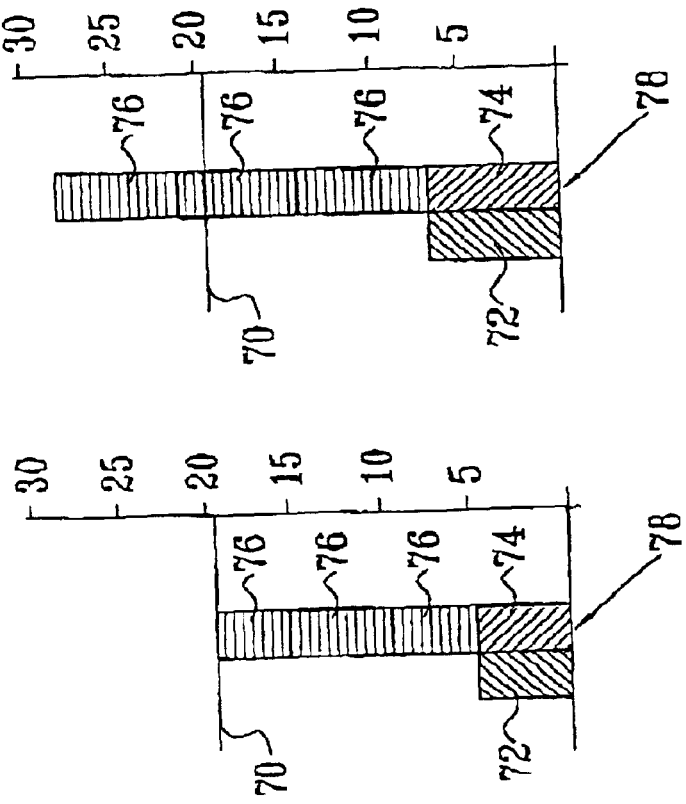
Figure 4A:
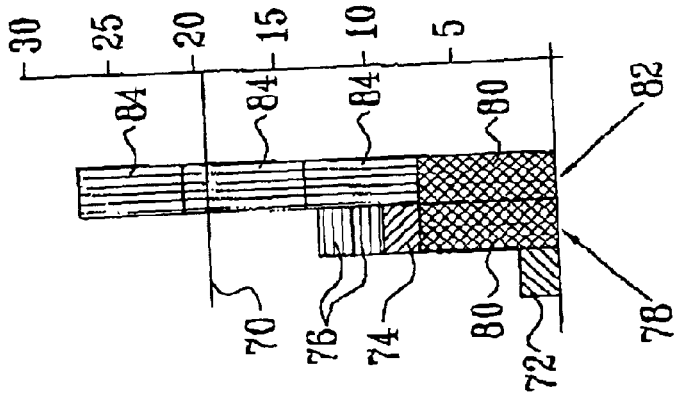
Figure 4B:
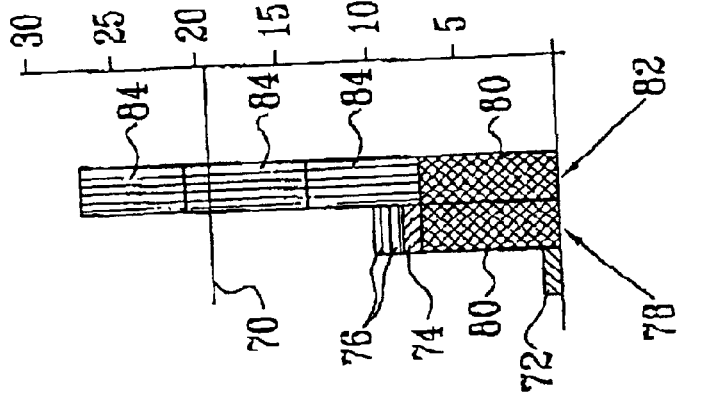
Figure 4C:
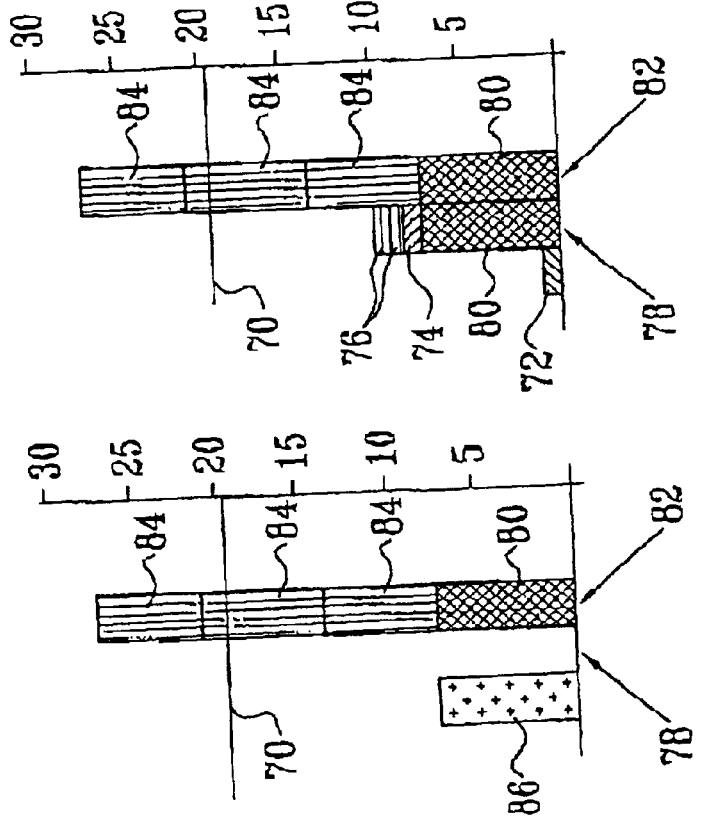
Figure 4D:
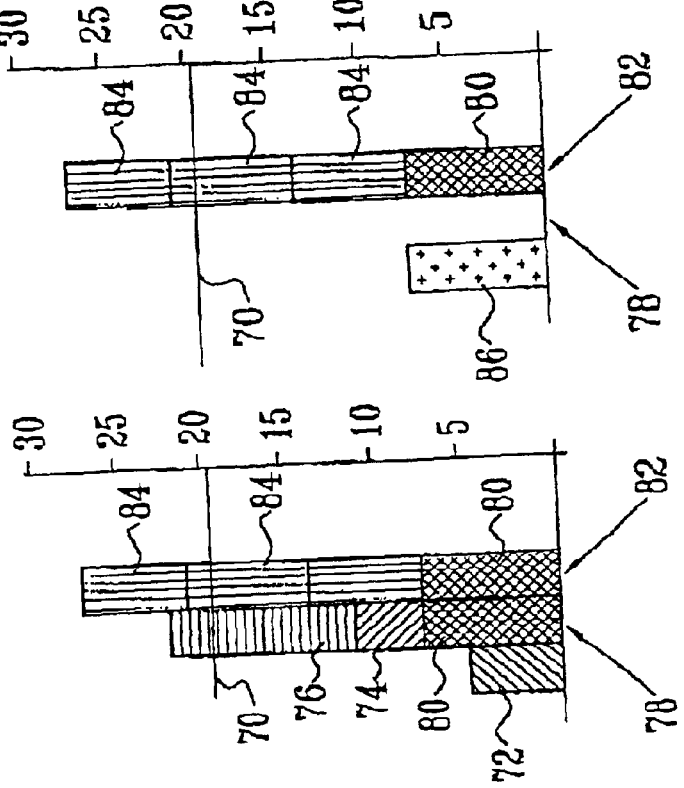

FIGS. 2A and 2B are flow charts that schematically illustrate a method for D-ARM, referred to herein as the Distributed Decision Miner (DDM) method, in accordance with a preferred embodiment of the present invention. FIG. 2A illustrates a process by which each of nodes 22 generates broadcast messages to the other nodes, decides which candidate itemsets are globally frequent in the overall database contained in memories 26, computes the support for the candidate itemsets and, on the basis of the support, finds association rules. FIG. 2B shows how nodes 22 treat broadcast messages that they receive from the other nodes in the course of the process of FIG. 2A. The processes of FIGS. 2A and 2B go on in parallel, that has not yet expressed its local support count, and given any subset of the support counts for an itemset, the local hypothesis must correctly predict whether the itemset is frequent or infrequent. The defining assumptions regarding H and P are not required to hold for every node. Rather, it is enough that the assumption regarding H will hold eventually, and that the assumption regarding P holds for one node that has not yet expressed its support count.

The process of FIG. 2A uses the approach of the Apriori method described above to identify candidate itemsets of incrementally increasing size k. Initially, k is set to one, and $C_1$ is set to be the set of all items i in I, at an initialization step 30. The set of nodes that have passed at this stage. Passed (as described further hereinbelow), is set to be the empty set. The nodes then begin to broadcast messages of the form $(i, x_i^j)$ on network 24, until they determine that all the nodes have passed, at a synchronization step 32.

In order to decide which messages to send, each node calculates the set of candidate itemsets $X_i \epsilon C_k$ for which it has not yet expressed its local support count, at a candidate calculation step 34. For each such candidate, each node calculates the global hypothesis H and the local hypothesis P. If H and P at some node disagree on whether a candidate itemset is frequent or infrequent, then the node broadcasts its support count for that candidate, at a support broadcast step 23. The nodes broadcast their support counts at a certain rate, limited by the bandwidth of network 24, each message containing the support of one or several candidates chosen by the node. No synchronization is required by these messages. Every time a node receives a message, it updates H and P for the candidate itemsets referred to in that message, as shown below in FIG. 2B.

If, for some node, H and P agree for every candidate itemset, that node has nothing to express and it passes on its turn, at a passing step 38. The node may later resume sending messages if arriving messages clause disagreement between H and P for some as-yet unexpressed candidate itemset. If a full round of passes was received from all parties, then H and P of all nodes agree on every candidate itemsets, triggering the condition of stop 32. At this point, all nodes 22 must have the same set of candidate itemsets, $L_k$, at a candidate set determination step 40: $L_k$ is simply the set of itemsets $X_i \epsilon C_k$ for which H now exceeds the predetermined minimum support level MinSup. This determination follows from the definition of P, based on which there are two possibilities for each candidate itemset: either there is one node whose P correctly predicts the itemset size, or all the local support counts have been collected. In the former case, the H and P of the node whose P correctly predicts the itemset size must agree; and since all nodes compute the same H, that H must be correct for all nodes. In the latter case, H must be correct by definition.

Once $L_k$ is known, all nodes 22 broadcast their support counts for any itemsets $X_i$ in $L_k$ that they did not broadcast previously, in a support collection step 42. This information is collected by the nodes for subsequent use. The Apriori procedure described above is then used to generate the collection of possible itemsets $C_{k+1}$ for the next iteration of the procedure, at an itemset generation step 44. In this step, candidate k+1-size itemsets are generated from the set of frequent k-size itemsets $L_k$. An itemset is included in $C_{k+1}$ if and only if all its k-size subsets are in $L_k$.

The next iteration then commences at step 32, until $C_{k+1}$ is found to be empty, at a termination step 46. At this point, the Apriori iteration ends, and all node have the same set of itemsets, $L=\{L_2, L_2, \ldots, L_k\}$, and the same support counts for all the itemsets. The nodes use this information to derive association rule, at a rule generation step 48, using any suitable procedure known in the art.

FIG. 2B shows how a given node 22 treats broadcast messages M that it receives from other nodes p, at a message reception step 50. The receiving node first checks whether the message is a "pass," at a pass checking step 52. If so, the receiving node adds p to the list of passed nodes, at a pass list compilation step 54. This list is consulted at a pass completion step 56 (which is essentially synchronization step 32, shown in FIG. 2A) to determine when all the nodes have passed. If all the nodes have already passed, it means that message M must contain the support of one or more itemsets in $L_k$ whose support p did not broadcast previously, and is now broadcasting at step 42 (FIG. 2A). In this case, the receiving node simply updates its corresponding support counts for these itemsets, at a support update step 58.

If at step 56 not all nodes have yet passed, it means that message M contains the support count for some itemset $X_i \epsilon C_k$, broadcast by p at step 36 (FIG. 2A). In this case, the receiving node checks to determine whether it previously listed p in the set Passed, at a pass list checking step 62. If so, p is now removed from the set Passed, at a pass removal step 64. In either case, the receiving node recalculates the selection hypotheses H and P for itemset $X_i$, at a parameter recalculation step 66, and uses the new hypotheses in making its own broadcast decision about this itemset at step 34 (FIG. 2A).

Substantially any choice of functions H and P that satisfy the criteria defined above can be used in the DDM method. As an exemplary choice, we define H and P as follows:

$$H(X_i) = \begin{cases} 0 & G(X_i) = \phi \\ \dfrac{\sum\limits_{x_i^p \in G(x_i)} x_i^p}{\sum\limits_{x_i^p \in G(x_i)} D^p} \cdot D & \text{otherwise} \end{cases} \quad (1)$$

$$P(X_i, DB^j) = \sum_{x_i^p \in G(x_i)} x_i^p + \frac{x_i^j}{D^j} \cdot \sum_{x_i^p \notin G(x_i)} D^p \quad (2)$$

Some alternative formulations of H and P, which may also be useful in decision problems of other types, are described in Appendix A, hereinbelow. When estimating H, the nodes assume that the unexpressed support counts for each itemset are, on the average, the same as those already expressed. For P, on the other hand, each node assumes that those nodes that have not yet expressed their local support counts for that itemset have the same relative support as it does itself.

Usually each node can choose which of several candidate itemsets will have its support count sent next. Many heuristics can be used to break ties, for example: whenever two nodes are able to express the local support counts of the same candidate itemset, it is best if the node whose local support count will make a greater change in P expresses its support first. If there are opposing nodes for a candidate itemset (some of whose P is larger and others whose P is smaller than MinSup·D), then the one that makes the greater change has the better chance of "convincing" opposing nodes that they are wrong. If an opposing node's value of P is changed by the message to the extent that it now agrees with that of the sending node, the opposing node will refrain from expressing its own support and thus will save the cost of additional messages.

It is therefore a good strategy for a node to send those support counts which will cause the greatest change in the corresponding P hypothesis of opposing nodes. When node k expresses support for itemset $X_i$, the influence on P of party 1 is equal to $$\left| x_i^k - \frac{x_i^l}{D^l} \cdot D^k \right|.$$

Since $x_i^1$ has not yet been expressed, however, we estimate the change as a rating function:

$$R(X_i, DB^k) = \left| x_i^k - \frac{H(X_i)}{D} \cdot D^k \right|. \quad (3)$$

Any node thus breaks a tie by choosing to broadcast the support counts of those itemsets that have the maximal $R(X_i, DB^j)$ value. Preferably, each node queues its itemsets for broadcasting according to their respective $R(X_i, DB^j)$ values, updating the values (and the queue order) as it receives new support count data.

Table I below summarizes, in pseudocode form, the DDM method described above:

TABLE I

DISTRIBUTED DECISION MINER

For node j out of n:
1. Initialize $C_1 = \{\{i\} : i \in I\}$, $k = 1$, Passed = Ø
2. While $C_k \neq \emptyset$
   (a) Do:
      Choose an itemset $X_i \in C_k$ that was not yet chosen
      and for which either $H(X_i) <$ MinSup $\leq P(X_i, DB^j)$ or
      $P(X_i, DB^j) <$ MinSup $\leq H(X_i)$, and broadcast
      (i, Support($X_i, DB^j$)).
      If no such itemset exists, broadcast (pass).
   (b) Until |Passed| = n.
   (c) $L_k = \{X_i \in C_k : H(X_i) \geq$ MinSup$\}$.
   (d) Broadcast the support counts for every $X_i \in L_k$ that
   was never chosen.
   (e) $C_{k+1} =$ Apriori_Gen($L_k$).
   (f) $k = k + 1$.
3. Gen_Rules($L_1, L_2, \ldots, L_k$).
When node j receives a message M from node p:
1. If M = (pass), insert p into Passed.
2. Else if |Passed| = n, then M is the support counts of
   itemsets that p has not yet sent. Update counts
   accordingly.
3. Else M = (i, Support($X_i, DB^P$)):
   If p ∈ Passed, then remove p from Passed.
   Recalculate $H(X_i)$ and $P(X_i, DB^j)$.

FIGS. 3A–D, 4A–D and 5A–D are bar charts that schematically describe a running example of the DDM method for a single itemset, with four computing nodes 22, labeled A through D. Each set of bar charts reflects a subsequent point in the procedure. Sub-figures A through D at each point represent the state of calculations of H and P for the itemset at each of the corresponding nodes. MinSup is arbitrarily fixed at 20.

The nodes begin in FIGS. 3A–D with local support counts 72 of 5, 7, 1 and 2, respectively. Each node calculates its private value 78 of P, based on its particular local support count. P in each cage is based on a local guaranteed count 74 equal to the node's local count 72, plus local speculative counts 76 of the other nodes, which are assumed by the node (in the absence of evidence to the contrary) to be equal to the local count. At first, before any messages are exchanged, the itemset is considered infrequent because the global hypothesis H is zero. Nodes A and B disagree with this hypothesis, however, because their local (private) hypothesis P is that the itemset is frequent.

At some point, this disagreement causes node B to broadcast its local count. This changes both private value 78 of local hypothesis P and a global value 82 of global hypothesis H at all the nodes, as shown in FIGS. 4A–D. For each node other than B, value 78 includes local guaranteed count 74 plus a public guaranteed count 80, due to the support count broadcast by B, plus speculative counts 76. Global value 82 for all the nodes now includes public guaranteed count 80, plus global speculative counts 84 attributed to the other nodes. The local count of node B is marked as a public local count 86, to indicate that B should not broadcast this count again.

At this point, node A is satisfied that its local and global hypotheses agree (both being greater than MinSup), but for nodes C and D, the hypotheses now disagree. Therefore, node C broadcasts its local support count 72. The result is shown in FIGS. 5A–5D. Now, for both nodes A and D, the global and local hypotheses agree. Since nodes B and C have already expressed their local counts, they accept the global hypothesis. This itemset is now known to be infrequent, and no more information will be transmitted with regard to this itemset, even though its exact support count remains unknown. The entire exchange has taken only two messages to complete, compared to six messages that would be required by FDM in order to reach the same conclusion.

Although the DDM method shown in Table I already reduces significantly the communication complexity of D-ARM, by comparison with methods known in the art, there are a number of ways in which it is possible to reduce the communication load still further. In this regard, it is often the case that partitions are not equally important. Typically, one partition may be exceptionally large and/or it may contain data that are more significant, in that a frequent itemset is even more frequent in that partition. For example, if each partition contains the data from a different store, then partitions that belong to superstores are obviously more significant than those belonging to grocery stores.

It is therefore desirable that nodes that have more convincing evidence (extreme support counts) send their support counts at an earlier stage of the negotiation, due to the likelihood that their evidence will shorten negotiation time and reduce communication. Similarly, nodes that do not have convincing evidence should preferably refrain from sending messages, so as not to use bandwidth that can be better employed by others. As given by equation (3) above, the rating function, $$R(X_i, DB^k) = \left| x_i^k - \frac{H(X_i)}{D} \cdot D \right|,$$

gives the kth node an estimate of the effectiveness of each of its possible messages. Thus, it is preferable that the series of broadcast messages transmitted by the nodes have a constantly-decreasing value of R. Generating such a series, however, requires that the nodes have global knowledge for weighing the importance of their own possible messages.

For this purpose, an improvement to the DDM method is presented below in Table II. This improved method is referred to herein as the Preemptive Distributed Decision Miner (PDDM) method. It achieves a nearly-monotonically decreasing series of R values by selecting as a leader the node that has sent the message with the maximal R. Each node tracks the leader's identity and the R value of the last message sent by the leader. No other node is allowed to send messages unless the R value of its own message is greater than that of the last message sent by the leader. IF some other node sends a message with R greater than that of the leader, this node then replaces the leader.

TABLE II

PREEMPTIVE DISTRIBUTED DECISION MINER

For node j out of n:
1. Initialize $C_1 = \{\{i\} : i \in I\}$, $k = 1$, Passed = Ø,
   leader = j, last_R = 0.
2. While $C_k \neq \emptyset$
   (a) Do:
      Choose an itemset $X_i \in C_k$ that was not yet chosen TABLE II-continued

PREEMPTIVE DISTRIBUTED DECISION MINER and for which either $H(X_i) < \text{MinSup} \leq P(X_i, DB^j)$ or $P(X_i, DB^j) < \text{MinSup} \leq H(X_i)$ and which maximizes $R(X_i, DB^j)$.
If such an itemset exists, and either $R(X_i, DB^j) >$ last_R, or leader = j, broadcast (i, Support($X_i$, $DB^j$)).
Else broadcast (pass).
  (b) Until |Passed| = n.
  (c) $L_k = \{X_i \in C_k : H(X_i) \geq \text{MinSup}\}$.
  (d) Broadcast the support counts for every $X_i \in L_k$ that was never chosen.
  (e) $C_{k+1} = \text{Apriori\_Gen}(L_k)$.
  (f) k = k + 1.
3. Gen_Rules($L_1, L_2, \ldots, L_k$).
When node j receives a message M from node p:
1. If M = (pass), insert p into Passed.
2. Else if |Passed| = n, then M is the support counts of itemsets that p has not yet sent. Update counts accordingly.
3. Else M = (i,Support($X_i$, $DB^p$)):
  If p ∈ Passed, then remove p from Passed.
  Recalculate $H(X_i)$ and $P(X_i, DB^j)$.
  If leader = p, then update last_R = $R(X_i, DB^p)$.
  Else if last_R < $R(X_i, DB^j)$
    Update last_R = $R(X_i, DB^p)$.
    Update leader = p.

Preventing other nodes from sending messages, as provided by PDDM, does not affect the correctness of the DDM method, because the method still terminates in the same state. It is important, however, that the leader hand the leadership on to another node when it decides to pass on its turn, since otherwise the method might not terminate. Hence, each time the leader passes on its turn, all nodes set the value of the leader's last R to zero. When the leader's last R is zero, any node that has any message to send may send it, and a node that has no message to send will pass on its turn.

It is easy for any node to calculate the leader's R value using equation (3). Optionally, R can be extended to include other properties of the message sent by the leader. For example, R can be used to encode information about the cost of sending the message, whether in terms of time (such as due to bandwidth restrictions) or money (when messages are sent, for instance, over a costly wireless channel). The PDDM method tries to reach an R-optimal negotiation regardless of what R encodes.

It will be observed that in a highly-skewed database, PDDM reduces considerably the communication complexity of the basic DDM method described above. In balanced databases, the communication complexity is roughly unchanged, but PDDM imposes a small additional computational burden on the nodes.

Whereas the DDM and PDDM methods described above focus on improving the communication efficiency of finding itemsets with sufficient support, the ultimate object of ARM is to find association rules that not only have support greater than MinSup, but which also have confidence greater than MinConf. It is not necessary to calculate the exact support or confidence or the rules, but only to verify that they exceed the predetermined thresholds. This observation allows further simplification of the communication process, as illustrated by the following two examples:

1. Assume that Parmesan, PastaSauce and Parmesan ∧ PastaSauce are all globally frequent. The rule PastaSauce⇒Parmesan should thus be considered. Assume also that this rule is locally frequent in every partition, but confident in none (i.e., $$\frac{\text{Support}(\text{Parmesan} \wedge \text{PastaSauce}, DB^p)}{\text{Support}(\text{PastaSauce}, DB^p)} < \lambda$$

for all p). Using DDM, three messages are required to determine that both Parmesan ∧ PastaSauce and PastaSauce are significant (compared to 6 n messages in FDM). Using DDM and PDDM, an additional 3(n−1) messages would be needed to collect the local support counts of the remaining nodes for Parmesan ∧ PastaSauce and PastaSauce before judging whether PastaSauce+z,1 Parmesan is significant. Note, however, that if there is no node at which the local confidence of this rule is above λ, then the global confidence cannot be above λ. By implementing an appropriate decision criterion, this rule could have been pruned without sending a single message.

2. Assume that this same rule is both supported and confident in every partition. If one node suggests that the rule is globally confident, and no other node objects, this information is sufficient to determine that the rule is indeed globally significant.

Figure 6A:
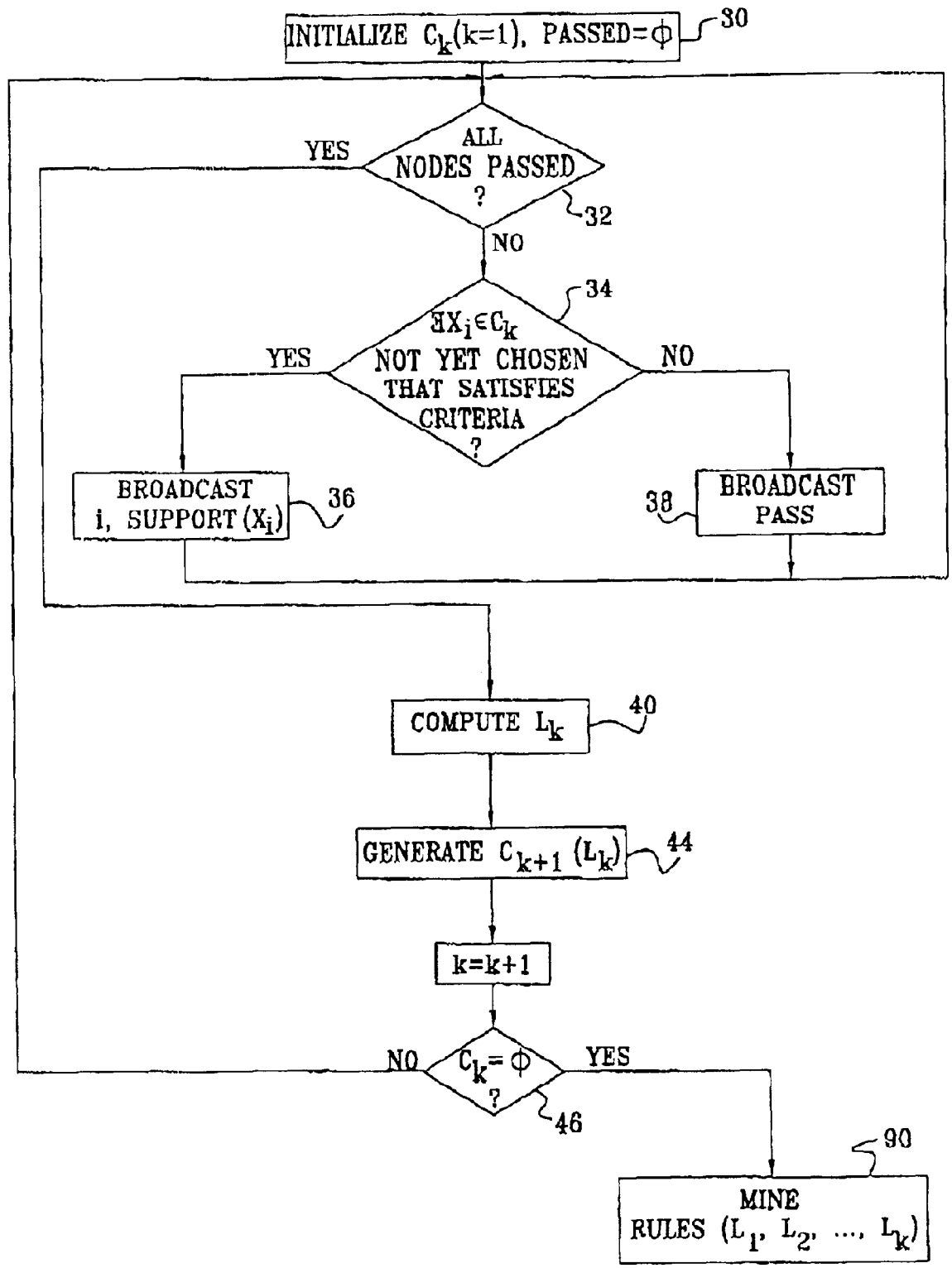
FIGS. 6A and 6B are flow charts that schematically illustrates a method for D-ARM, in accordance with another preferred embodiment of the present invention.
Figure 6B:
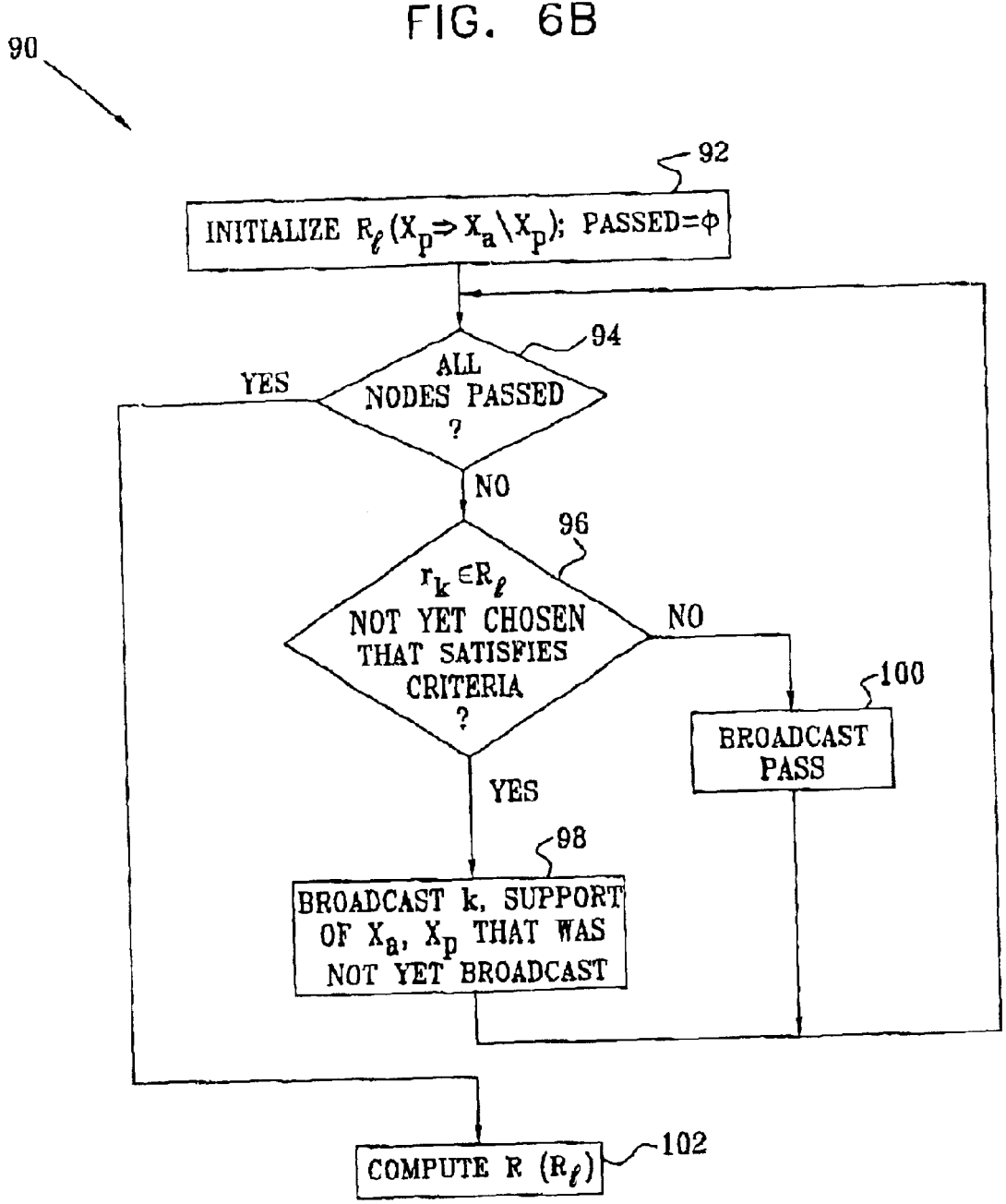

FIGS. 6A and 6B are flow charts that schematically illustrate a method for D-ARM based on these observations, in accordance with a preferred embodiment of the present invention. The method is referred to herein as the Distributed Dual Decision Miner (DDDM) and is shown in pseudocode form in Table III below.

In the first phase of this method, shown in FIG. 6A, itemsets with support above MinSup are collected into a set $L=\{L_1, L_2, \ldots, L_k\}$, substantially as described above. Either the DDM or the PDDM method may be used for this purpose. It will accordingly be observed that FIG. 6A is substantially similar to FIG. 2A, up through step 46, except that steep 42 is eliminated here. Because of the improved method introduced here for mining association rules with high confidence, which is performed at a mining stop 90, there is no need for all the nodes to broadcast their support counts for all the itemsets in L. The method by which nodes 22 process the broadcast messages that they receive is substantially identical to that shown in FIG. 2B.

TABLE III

DISTRIBUTED DUAL DECISION MINER

For node j out of n:
1. Initialize $C_1 = \{\{i\} : i \in I\}$, k = 1, Passed = ∅
2. While $C_k \neq ∅$
  (a) Do:
    Choose an itemset $X_i \in C_k$ that was not yet chosen and for which either $H(X_i) < \text{MinSup} \leq P(X_i, DB^j)$ or $P(X_i, DB^j) < \text{MinSup} \leq H(X_i)$, and broadcast (i, Support($X_i$, $DB^j$)).
    If no such itemset exists, broadcast (pass).
  (b) Until |Passed| = n.
  (c) $L_k = \{X_i \in C_k : H(X_i) \geq \text{MinSup}\}$.
  (d) $C_{k+1} = \text{Apriori\_Gen}(L_k)$.
  (e) k = k + 1.
3. Mine_Rules ($L_1, L_2, \ldots, L_k$).
When node j receives a message M from node p:
1. If M = (pass), insert p into Passed.
2. Else if |Passed| = n, then M is the support counts of itemsets that p has not yet sent. Update counts accordingly.
3. Else M = (i,Support($X_i$, $DB^p$)):
  If p ∈ Passed, then remove p from Passed.
  Recalculate $H(X_i)$ and $P(X_i, DB^j)$.

At step 90, nodes 22 mine L to find rules whose confidence is greater than a user-defined threshold λ. This method, referred to herein as the Distributed Decision Confidence Miner (DDCM) is shown in FIG. 6B, and is also listed below in pseudocode form in Table IV. It corresponds to the step "Mine$_{13}$ Rules(L$_1$, L$_2$, . . . , L$_k$)" in Table III.

At the outset of DDCM, each node 22 constructs the set of all rules R$_1$ supported by L, at a rule initialization step 92. As listed in Table IV, R$_1$ contains all rules r$_k$ of the form X$_p$ $\Rightarrow$ X$_a$\X$_p$ such that X$_p$, X$_a$∈L and X$_p$ ⊂ X$_a$. A set of Passed nodes, which is initially empty, is used here as in the DDM method. DDCM continues iteratively to evaluate rules r$_k$ and to collect their support until all nodes have passed, at a rule synchronization step 94.

DDCM then makes one round of negotiations among nodes 22 to decide which of the candidate rules r$_k$ satisfy the condition that Support(X$_a$, DB)≧λ·Support(X$_p$, DB). In the course of this negotiation, each node 22 determines which rules are likely to influence this decision, at a candidate rule selection step 96. The determination is based on global and local rule hypothesis criteria, H and P, which are conceptually similar to the itemset hypothesis criteria used at step 34. As in the case of the basic DDM method, a range of different choices of H and P may be used here, as well. Exemplary hypothesis functions are defined by equations (4) and (5) below. For simplicity of notation, we represent the rule X$_p$+z,1 X$_a$\X$_p$ as r$_{ap}$ and define the group of rules G(r$_{ap}$) as $$G(r_{ap}) = \{j : x_p^j \in G(X_p) \wedge x_a^j \in G(X_a)\},$$

wherein G(X$_p$) and G(X$_a$) are the corresponding groups of itemsets.

$$p(r_{ap}) = \frac{\sum_{l \in G(r_{ap})} x_a^l + (n - |G(r_{ap})|) \cdot x_a^i}{\sum_{l \in G(r_{ap})} x_p^l + (n - |G(r_{ap})|) \cdot x_p^i} \quad (4)$$

$$H(X_i) = \begin{cases} \dfrac{\sum_{l \in G(r_{ap})} x_a^l}{\sum_{l \in G(r_{ap})} x_p^l} & G(r_{ap}) > 0 \\ 0 & \text{otherwise} \end{cases} \quad (5)$$

For each node 22, a given rule r$_{ap}$ will be selected at step 96 if the values of H and P calculated by this node for this rule disagree as to whether or not the confidence of the rule is above the threshold λ. If such a rule exists, and node 22 has not previously broadcast the support of either or both of X$_a$ and X$_p$, the node broadcasts the as-yet unbroadcast support, at a broadcasting step 98. The node thus sends a message of one of three types:

$$\langle k, x_p^i, x_a^i \rangle, \langle k, x_p^i \rangle, \text{ or } \langle k, x_a^i \rangle,$$

depending on the choice of support counts to be expressed, wherein k is the number of the rule in some deterministic enumeration. A ranking function R may be defined, as in PDDM, to determine the order in which the node will choose the rules for broadcast, for example:

$$R(r_{ap}, DB^i) = \left| \frac{x_a^i - \frac{H(X_a)}{D} \cdot D^i}{x_p^i - \frac{H(X_p)}{D} \cdot D^i} \right| \quad (6)$$

When node 22 has no more rules remaining that meet the criteria of step 96, it broadcasts a pass message, at a pass broadcast step 100.

At the same time as nodes 22 transmit messages in steps 96 through 100, they also receive the messages that are broadcast by the other nodes. The nodes handle these messages in a manner similar to that shown in FIG. 2B. Whenever one of the nodes receives a broadcast message containing another node's support count for some rule r$_{ap}$, it uses the support count to recalculate G(r$_1$) for every rule r$_1$ that includes either X$_a$ or X$_p$. If G(r$_1$) changes as a consequence, the node then updates H(r$_1$) and P(r$_1$) accordingly, for subsequent use at step 96.

Once all the nodes have passed at step 94, each node can compute the complete set R$_T$, containing the rules r$_k$ from the original set R$_1$ that have been found to have confidence greater than the threshold λ, at a mining completion step 102. At this point, the global hypotheses H of all the nodes will have converged, so that the members of R$_T$ are simply those rules for which H(r$_k$)≧λ.

TABLE IV

DISTRIBUTED DECISION CONFIDENCE MINER

For node i of n nodes:
1. Initialize
   R$_1$ to be set of all rules X$_p$ $\Rightarrow$ X$_a$\X$_p$ such that X$_p$,
   X$_a$ ∈ L and X$_p$ ⊂ X$_a$.
   Passed = ∅.
2. Do:
   Choose r$_k$ to be some X$_p$ $\Rightarrow$ X$_a$\X$_p$ ∈ R$_1$ such that i ≠
   G(r$_k$), and either H(r$_k$) < λ ≦ P(r$_k$, DB$^i$) or P(r$_k$, DB$^i$) < λ
   ≦ H(r$_k$).
      If both Support(X$_p$, DB$^i$) and Support(X$_a$, DB$^i$)
      were not sent, broadcast
      (k,Support(X$_p$, DB$^i$),Support(X$_a$, DB$^i$)).
      If Support(X$_p$, DB$^i$) was already sent,
      broadcast (k,Support(X$_a$, DB$^i$)).
      If Support(X$_a$, DB$^i$) was already sent,
      broadcast (k,Support(X$_p$, DB$^i$)).
   If there is no such r$_k$, broadcast (pass).
3. Until |Passed| = n.
4. R$_T$ = {r$_k$ ∈ R$_1$ : H(r$_k$) ≧ λ}.
When node i receives a message M from node j:
1. If M = (pass), insert p into Passed.
2. Else M = (k,Support(X$_p$, DB$^j$),Support(X$_a$, DB$^j$)).
      If j ∈ Passed, then remove j from Passed.
      Recalculate G(r$_1$) for every r$_1$ that includes X$_a$
      and/or X$_p$; if G\(r$_1$) changes, update H(r$_1$) and P(r$_1$),
      as well.

The number of rules that can be generated from a given set of frequent itemsets is enormous. In order to check all the potential rules induced by a single k-size frequent itemset X, it is necessary to check every rule X$_p$⇒X$_a$\X$_p$: X$_p$ ⊂ X$_a$⊆X. This is a total of $$\sum_{i=1}^{k} \binom{k}{i} \sum_{j=1}^{i} \binom{i}{j} = 3^k$$

potential rules. It is possible, however, to prune the rules in advance using the following observation: If X$_p$ and X$_a$ are two itemsets, such that X$_p$⊂X$_a$, and the confidence of X$_p$ ⇒X$_a$\X$_p$ is below the MinConf threshold, then for any X$_{pp}$⊂X$_p$, the confidence of X$_{pp}$⇒X$_a$\X$_{pp}$ is also below MinConf. Similarly, for any X$_{aa}$⊂X$_a$, the confidence of X$_p$ ⇒X$_{aa}$\X$_p$ is below MinConf. This observation is correct because Support(X$_p$, DB)≦Support(X$_{pp}$, DB), and Support(X$_{aa}$, DB)≦Support(X$_a$, DB). If, on the other hand, the rule X$_p$⇒X$_a$\X$_p$ is confident, then for every X$_p$ ⊂ X$_{pp}$ ⊂ X$_{aa}$ ⊆X$_a$, the rule X$_{pp}$⇒X$_{aa}$\X$_{pp}$ is confident as well.

This observation allows us to alter the DDCM method of Table IV by splitting it into several rounds. This improved method, referred to herein as the Pruning Distributed Decision Confidence Miner (PDDCM), is shown below in Table V. At each round of the PDDCM method, many of the possible rules can either be pruned or inferred with no communication. We initialize the candidate rule set $R_k$ with a single rule $R_0=\{\emptyset \Rightarrow \emptyset\}$, which must be both supported and confident. In each round, nodes 22 run a procedure similar to DDCM to decide which of the rules in $R_k$ are confident. The nodes develop new candidate rules according to the following two candidate generation methods: If a rule $r_k$ is found to be confident, then every rule that specifies the precedent or generalizes the antecedent of $r_k$ must also be confident, and every rule that further specifies the antecedent is considered a candidate. If, on the other hand, a rule is found not to be confident, another rule that specifies its precedent may still be a candidate.

TABLE V

PRUNING DISTRIBUTED DECISION CONFIDENCE MINER

Definition: For some $X \in L_k$, specifiers(X) =
  $\{X' \in L_{k+1} : X \subset X'\}$.
For node i of n nodes:
1. Initialize $R_0 = \{\emptyset \Rightarrow \emptyset\}$, $k = 0$, $R = \emptyset$.
2. While $R_k \neq \emptyset$
   (a) Initialize Passed = $\emptyset$.
   (b) Do:
      Choose $r_1$ to be some $X_p \Rightarrow X_a \backslash X_p \in R_k$ such that $i \neq G(r_1)$, and either $H(r_1) < \lambda \leq P(r_1, DB^i)$ or $P(r_1, DB^i) < \lambda \leq H(r_1)$.
         If both Support($X_p$, $DB^i$) and Support($X_a$, $DB^i$)
         were not sent, broadcast
         (k,Support($X_p$, $DB^i$),Support($X_a$, $DB^i$)).
         If Support($X_p$, $DB^i$) was already sent,
         broadcast (k,Support($X_a$, $DB^i$)).
         If Support($X_a$, $DB^i$) was already sent,
         broadcast (k,Support($X_p$, $DB^i$)).
      If there is no such $r_k$, broadcast (pass).
   (c) Until |Passed| = n.
   (d) For each $r_1 = X_p \Rightarrow X_a \backslash X_p \in R_k$ such that $H(r_1) <$ MinConf:
      $R_{k+1} = R_{k+1} \cup \{X_{pp} \Rightarrow X_a \backslash X_{pp} : X_{pp} \in$ specifiers($X_p$)$\}$.
   (e) For each $r_1 = X_p \Rightarrow X_a \backslash X_p \in R_k$ such that $H(r_1) \geq$ MinConf:
      $R_{k+1} = R_{k+1} \cup \{X_p \Rightarrow X_{aa} \backslash X_p : X_{aa} \in$ specifiers($X_a$)$\}$.
      $R_T = R_T \cup \{X_{pp} \Rightarrow X_{aa} \backslash X_{pp} : X_p \subset X_{pp} \subset X_{aa} \subset X_a\}$.
   (f) $k = k + 1$.
When node i receives a message M from node j:
1. If M = (pass), insert p into Passed.
2. Else M = (k,Support($X_p$, $DB^j$),Support($X_a$, $DB^j$)).
   If $j \in$ Passed, then remove j from Passed.
   Recalculate $G(r_1)$ for every $r_1$ that includes $X_a$
   and/or $X_p$; if $G\backslash(r_1)$ changes, update $H(r_1)$ and $P(r_1)$,
   as well.

The inventors have tested the methods of the present invention on synthetic databases, generated using the "gen" tool, which is available at www.almaden.ibm.com/cs/quest. The results have been compared with those obtained by processing the same databases using the CD and FDM algorithms described in the Background of the Invention. The number of bytes that must be transmitted to find association rules using CD or FDM grows rapidly as the value of MinSup or the number of computing nodes n increase. The growth is considerably slower when the methods of the present invention are used, with DDDM giving the best performance on unskewed databases. In heavily-skewed databases, PDDM is substantially better than DDM. A method combining the features of DDDM and PDDM would likely give the best overall performance.

The methods described hereinabove may be used to address substantially any D-ARM problem, but they are particularly advantageous in applications involving a large number of widely-distributed computing nodes. For example, these methods may be used to mine peer-to-peer system, for purposes such as finding associations between the MP3 files of different Napster users (more than 1.5 million files in about 10,000 libraries at present). No method known in the art can cope with n=10,000 with the Internet communication speed available today. As another example, the methods of the present invention may be used for broad-scale parallelization of data mining, splitting the problem until each partition fits into the memory of a conventional personal computer. In addition, these methods are particularly useful in environments in which communication bandwidth is at a premium, such as billing centers for large communication providers. Although these billing centers usually have fast and wide-ranging networks, data mining is performed in such centers as an auxiliary task, and the resources it consumes come at the expense of the main system activity.

Although the preferred embodiments described above are directed to count distribution (CD) type approaches to D-ARM, the principles of the present invention may also be applied, mutatis mutandis, to approaches of other types, such as data distribution (DD) approaches, as described in the above-mentioned article by Agrawal and Shafer. Similarly, although these preferred embodiments are based on certain characteristics of common networks and computing systems, such as broadcast support, for example, the method of the present invention are not inherently dependent on particular system or network characteristics, and may therefore be adapted to work in substantially any distributed computing environment.

It will thus be appreciated that the preferred embodiments described above are cited by way of example, and that the prevent invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix A–H And P for Other Target Functions

DDM can be applied to a variety of decision problems. A sequential decision problem can be written as f: x, $\delta \rightarrow \{0,1\}$, where x is some arbitrary measure and $\delta$ is a threshold which is provided by the user. In the distributed form of a decision function we assume that the measure is the average (or the sum) of N measures, each held by a different computing node. Hence, $$g : \overline{x}, \delta \rightarrow \{0, 1\} = f; \frac{1}{n}\sum_{i=1}^{N} x_i, \delta \rightarrow \{0, 1\}.$$

In the preferred embodiments of the present invention described above, the hypothesis functions H and P are defined in terms of two target functions:

$$f_{support}(x, MinSup) = \begin{cases} 0 & x < MinSup \\ 1 & x \geq MinSup \end{cases}$$

and

-continued $$f_{confidence}(\langle x, y \rangle, MinConf) = \begin{cases} 0 & \frac{x}{y} < MinConf \\ 1 & \frac{x}{y} \geq MinConf \end{cases},$$

Here we will show that the same algorithm can be applied (i.e., H and P can be defined) for two other target functions: The variance and the entropy $h_2$. Both target functions are defined on distributions, which can be referred to as vectors of values.

The H function will, in both cases, have the same rationale as in the case of $f_{support}$ and $f_{confidence}$; the nodes will assume that the partial information published at each stage of the algorithm correctly represents the distribution. As for the P function, it becomes a little more complicated because the upper bound and the lower bound are calculated using different formulas. Also, they require the computation of the smoothest possible distribution (hence SPD), given a partial group of the distribution vectors. For k=2 the solution is simple:

- If $x_0^r + \sum_{i \in G} x_0^i < \frac{1}{2}$ and $x_1^r + \sum_{i \in G} x_1^i < \frac{1}{2}$ - the SPD is $\left(\frac{1}{2}, \frac{1}{2}\right)$

- If $x_0^r + \sum_{i \in G} x_0^i > \frac{1}{2}$ - the SPD is $\left(x_0^r + \sum_{i \in G} x_0^i, 1 - x_0^r - \sum_{i \in G} x_0^i\right)$

- If $x_1^r + \sum_{i \in G} x_1^i > \frac{1}{2}$ - the SPD is $\left(1 - x_1^r - \sum_{i \in G} x_1^i, x_1^r + \sum_{i \in G} x_1^i\right)$ For k larger than 2 the computation of the SPD can be computed by an algorithm which has complexity linear in k.

Variance:

The variance target function is defined as $$f_{Var}(X, \sigma^2) = \begin{cases} 0 & Var(X) < \sigma^2 \\ 1 & Var(X) \geq \sigma^2 \end{cases}, \text{ where } X = \{x_1, x_2, \ldots, x_k\}$$

is a distribution measure. The H function will have the same rationale as in the case of the support and confidence target functions, it will assume that the data already sent represents the data that was not sent. Hence, given $X_G$–a partial group of $X^i$ vectors, sent by part of the nodes $$H(X_G) = \begin{cases} 0 & |X_G| = 0 \\ Var\left(\frac{1}{|X_G|} \sum_{X^i \in X_G} X^i\right) & \text{otherwise} \end{cases};$$

where $$\frac{1}{|X_G|} \sum_{X^i \in X_G} X^i$$

is the piecewise average distribution. Each node r will also compute:

$$P(X_G, X^r) = \begin{cases} Var\left(\frac{1}{N}\left[(N - |X_G|)X^r + \sum_{X^i \in X_G} X^i\right]\right) & H(X_G) > \sigma^2 \\ Var(SPD(X_G)) & H(X_G) \leq \sigma^2 \end{cases}.$$

Binary Entropy:

The binary entropy target function is defined as $$f_{h_2}(x, \gamma) = \begin{cases} 0 & h_2(X) < \gamma \\ 1 & h_2(X) \geq \gamma \end{cases};$$

where $X = \{x_1, x_2, \ldots, x_k\}$ is a distribution measure. The H function will have the same rationale as in the case of the support and confidence target functions, it will assume that the data already sent represents the data that was not sent. Hence, given $X_G$– a partial group of $X^i$ vectors, sent by part of the nodes, $$H(X_G) = \begin{cases} 0 & |X_G| = 0 \\ h_2\left(\frac{1}{|X_G|} \sum_{X^i \in X_G} X^i\right) & \text{otherwise} \end{cases};$$

where $$\frac{1}{|X_G|} \sum_{X^i \in X_G} X^i$$

is the piecewise average distribution. Each node r will compute:

$$P(X_G, X^r) = \begin{cases} h_2\left(\frac{1}{N}\left[(N - |X_G|)X^r + \sum_{X^i \in X_G} X^i\right]\right) & H(X_G) < \gamma^2 \\ h_2(SPD(X_G)) & H(X_G) \geq \gamma^2 \end{cases}.$$

What is claimed is:

1. A method for mining association rules in a database that is divided into multiple partitions associated with respective computing nodes, the method comprising:
    transmitting messages among the nodes with respect to local support of an itemset in the respective partitions of the database;
    responsive to the messages transmitted by a subset of the nodes, determining the itemset to be globally frequent in the database before the nodes outside the subset have transmitted the messages with respect to the local support of the itemset in their respective partitions; and
    computing an association rule with respect to the itemset, responsive to having determined the itemset to be globally frequent.

2. A method according to claim 1, wherein transmitting the messages comprises conveying the messages over a communication network connecting the nodes one to another.

3. A method according to claim 2, wherein conveying the messages comprises broadcasting the messages.

4. A method according to claim 2, wherein conveying the messages comprises stacking a plurality of the messages together in a single data frame for transmission over the network.

5. A method according to claim 1, wherein transmitting the messages comprises computing a candidacy criterion at each of the nodes, for use in determining whether the itemset is globally frequent, and choosing the itemset with respect to which one of the messages is to be transmitted responsive to the candidacy criterion.

6. A method according to claim 5, wherein computing the candidacy criterion comprises receiving one of the messages sent by another one of the nodes, and recomputing the candidacy criterion responsive to the local support conveyed by the received message, and wherein choosing the itemset comprises deciding whether to transmit another one of the messages with respect to the itemset based on the recomputed criterion.

7. A method according to claim 6, wherein deciding whether to transmit another one of the messages comprises transmitting another one of the messages only until a conclusion is reached, responsive to the candidacy criterion, as to whether the itemset is globally frequent in the database.

8. A method according to claim 6, wherein transmitting the messages comprises terminating transmission of the messages when the candidacy criterion computed at every one of the nodes agrees as to whether the itemset is globally frequent.

9. A method according to claim 5, wherein the itemset is one of a plurality of itemsets in the database, and wherein computing the candidacy criterion comprises computing respective candidacy criteria for the plurality of the itemsets, and wherein choosing the itemsets comprises ranking the itemsets responsive to the respective candidacy criteria for transmission of the messages with respect thereto.

10. A method according to claim 9, wherein ranking the itemsets comprises determining a respective ranking for each of the nodes, and wherein transmitting the messages comprises selecting one of the nodes that is to transmit the messages, responsive to the respective ranking.

11. A method according to claim 10, wherein determining the respective ranking comprises updating the ranking as the messages are transmitted, and wherein selecting the one of the nodes comprises changing a selection of the one of the nodes that is to transmit the messages responsive to a change in the ranking.

12. A method according to claim 1, wherein computing the association rule comprises collecting the local support of the itemset from the nodes outside the subset, for use in computing the association rule applicable to the itemset, only after it is determined that the itemset is globally frequent.

13. A method according to claim 12, wherein the itemset is one of a plurality of itemsets in the database, and wherein collecting the local support comprises collecting the local support of the itemsets that were determined to be globally frequent, while ignoring the local support of the itemsets that were not determined to be globally frequent.

14. A method according to claim 12, wherein computing the association rule comprises assessing a confidence level of the rule responsive to the local support, and wherein collecting the local support comprises computing a confidence criterion at each of the nodes, for use in determining whether the confidence level is above a predetermined threshold, and choosing the itemset with respect to which the local support is to be collected responsive to the confidence criterion.

15. A method according to claim 14, wherein computing the confidence criterion comprises receiving the local support sent by another one of the nodes, and recomputing the confidence criterion responsive to the received local support, and wherein choosing the itemset comprises continuing to collect the local support until it is determined that the confidence level is above the predetermined threshold, based on the recomputed criterion.

16. A method according to claim 1, wherein the itemset is one of a plurality of itemsets in the database, each of the itemsets having a size, and wherein determining the itemset to be globally frequent comprises finding the itemsets of size k that are globally frequent, and wherein transmitting the messages comprises transmitting the messages with respect to the local support of the itemsets of size k+1 all of whose subsets are itemsets of size k that were found to be globally frequent.

17. A method for mining association rules in a database that is divided into multiple partitions associated with respective computing nodes, the partitions including at least first and second partitions respectively associated with at least first and second nodes among the computing nodes, the method comprising:

computing an initial candidacy criterion at each of the nodes, for use in determining whether an itemset is globally frequent in the database;

responsive to the candidacy criterion, transmitting a first message from the first node to the other nodes conveying a local support of the itemset in the first partition;

upon receiving the message, recomputing the candidacy criterion at the second node responsive to the local support conveyed by the message;

transmitting, responsive to the recomputed candidacy criterion, a second message from the second node to the other nodes, conveying the local support of the itemset in the second partition; and computing an association rule with respect to the itemset, responsive to the first and second messages.

18. A method according to claim 17, wherein the nodes further comprise a third node, and wherein the method comprises recomputing the candidacy criterion at the third node, responsive to the first and second messages, and determining at the third node that the itemset is globally frequent based on the recomputed criterion.

19. A method according to claim 18, wherein determining at the third node that the itemset is globally frequent comprises making a conclusive determination that the itemset is globally frequent before all the nodes have transmitted messages conveying the local support of the itemset in the respective partitions of the database.

20. A method according to claim 18, wherein computing the association rule comprises computing the rule responsive to having determined that the itemset is globally frequent based on the recomputed criteria.

21. A method according to claim 17, wherein computing the initial candidacy criteria comprises computing at each of the first and second nodes a local hypothesis as to whether the itemset is globally frequent, based on the local support of the itemset in the first and second partitions, respectively, and wherein recomputing the candidacy criterion comprises recomputing the local hypothesis and computing a global hypothesis as to whether the itemset is globally frequent, based on the local support conveyed in the first message, and wherein transmitting the second message comprises deciding whether to transmit the second message responsive to the local and global hypotheses.

22. A method according to claim 21, wherein deciding whether to transmit the second message comprises deciding to transmit the second message only if the local and global hypotheses computed at the second node disagree as to whether the itemset is globally frequent.

23. A method according to claim 21, wherein the itemset is one of a plurality of itemsets in the database, and wherein computing and recomputing the candidacy criterion comprise computing and recomputing respective local and global hypotheses for the plurality of the itemsets, and wherein transmitting the first and second messages comprises choosing the itemset with respect to which the messages are to be transmitted responsive to the respective hypotheses.

24. A method according to claim 23, wherein choosing the itemset comprises ranking the itemsets responsive to a measure of disagreement between the local and global hypotheses with respect to the itemsets.

25. A method according to claim 23, wherein deciding whether to transmit the second message comprises, if none of the local and global hypotheses disagree, transmitting a pass message.

26. Apparatus for mining association rules, comprising:
a plurality of storage devices, adapted to hold respective partitions of a database; and
a corresponding plurality of computing nodes, each node being associated with a respective one of the storage devices and coupled to communicate with the other nodes over a communication network, the nodes being adapted to transmit messages one to another with respect to local support of an itemset in the respective partitions of the database, and responsive to the messages transmitted by a subset or the nodes, to determine the itemset to be globally frequent in the database before the nodes outside the subset have transmitted the messages with respect to the local support of the itemset in their respective partitions, and to compute an association rule with respect to the itemset, responsive to having determined the itemset to be globally frequent.

27. Apparatus for mining association rules, comprising:
a plurality of storage devices, adapted to hold respective partitions of a database, including at least first and second storage devices holding respective first and second partitions of the database; and
a corresponding plurality of computing nodes, each node being associated with a respective one of the storage devices, including at least first and second nodes respectively associated with the first and second storage devices, the nodes being coupled to communicate with one another over a communication network, each of the nodes further being adapted to complete an initial candidacy criterion, for use in determining whether an itemset is globally frequent in the database, such that responsive the candidacy criterion, the first node transmits a first message to the other nodes conveying a local support of the itemset in the first partition, and such that upon receiving the message, the second node recomputes the candidacy criterion responsive to the local support conveyed by the message and transmits, responsive to the recomputed candidacy criterion, a second message from the second node to the other nodes, conveying the local support of the itemset in the second partition, so that the nodes compute an association rule with respect to the itemset responsive to the first and second message.

28. A computer software product, comprising a computer-readable medium in which program instructions are stored, which instructions, when read by computing nodes that are associated with respective storage devices holding respective partitions of a database and are coupled to communicate with one another over a communication network, cause the nodes to transmit messages one to another with respect to local support of an itemset in the respective partitions of the database, and responsive to the messages transmitted by a subset of the nodes, to determine the itemset to be globally frequent in the database before the nodes outside the subset have transmitted the messages with respect to the local support of the itemset in their respective partitions, and to compute an association rule with respect to the itemset, responsive to having determined the itemset to be globally frequent.

29. A computer software product, comprising a computer-readable medium in which program instructions are stored, which instructions, when read by computing nodes that are associated with respective partitions of a database, including at least first and second nodes respectively associated with first and second partitions of the database, and which are coupled to communicate with one another over a communication network, cause the nodes to compute an initial candidacy criterion, for use in determining whether an itemset is globally frequent in the database, and responsive the candidacy criterion, cause the first node to transmit a first message to the other nodes conveying a local support of the itemset in the first partition, and cause the second node, upon receiving the message, to recompute the candidacy criterion responsive to the local support conveyed by the message and to transmit, responsive to the recomputed candidacy criterion, a second message to the other nodes, conveying the local support of the itemset in the second partition, and cause the nodes to compute an association rule with respect to the itemset responsive to the first and second messages.

30. A method for processing items in a database that is divided into multiple partitions associated with respective computing nodes, the method comprising:
transmitting messages among the nodes conveying local information regarding an itemset in the respective partitions of the database;
responsive to the messages transmitted by a subset of the nodes, determining the itemset to be globally significant with respect to a decision to be made in reference to the database before the nodes outside the subset have transmitted the messages with respect to the local information regarding the itemset in their respective partitions; and
making the decision with respect to the itemset, responsive to having determined the itemset to be globally significant.

31. A method for reaching a decision regarding items in a database that is divided into multiple partitions associated with respective computing nodes, the partitions including at least first and second partitions respectively associated with at least first and second nodes among the computing nodes, the method comprising;
computing an initial candidacy criterion at each of the nodes, for use in selecting an itemset in the database of potential significance to the decision;
responsive to the candidacy criterion, transmitting a first message from the first node to the other nodes conveying local information regarding the itemset in the first partition;
upon receiving the message, recomputing the candidacy criterion at the second node responsive to the local information conveyed by the message;

transmitting, responsive to the recomputed candidacy criterion, a second message from the second node to the other nodes, conveying the local information regarding the itemset in the second partition; and making the decision with respect to the itemset, responsive to the first and second messages.

32. A method according to claim 31, wherein computing the initial candidacy criterion comprises determining the candidacy criterion based on a target function selected responsive to the decision that is to be made.

* * * * *